US012767266B2

(12) United States Patent
Beutin et al.

(10) Patent No.: US 12,767,266 B2
(45) Date of Patent: Oct. 20, 2026

(54) SUSPENSION FORK ASSEMBLY

(71) Applicant: HAYES BICYCLE GROUP INC., Mequon, WI (US)

(72) Inventors: Kyle J Beutin, Wauwatosa, WI (US); Robert A Bolke, West Jordan, UT (US); Michael W Gentry, Ogden, UT (US)

(73) Assignee: HAYES BICYCLE GROUP INC., Mequon, WI (US)

( * ) Notice: Subject to any disclaimer, the term of this patent is extended or adjusted under 35 U.S.C. 154(b) by 535 days.

(21) Appl. No.: 18/346,173

(22) Filed: Jun. 30, 2023

(65) Prior Publication Data

US 2024/0208604 A1 Jun. 27, 2024

Related U.S. Application Data

(60) Provisional application No. 63/358,805, filed on Jul. 6, 2022.

(51) Int. Cl.
*B62K 25/08* (2006.01)
*B62K 21/02* (2006.01)

(52) U.S. Cl.
CPC .............. *B62K 25/08* (2013.01); *B62K 21/02* (2013.01)

(58) Field of Classification Search
CPC ................................ B62K 25/08; B62K 21/02
See application file for complete search history.

(56) References Cited

U.S. PATENT DOCUMENTS

| | | | | |
|---|---|---|---|---|
| 5,609,349 | A * | 3/1997 | Buckmiller ............ | B62K 21/02 280/281.1 |
| 5,848,675 | A | 12/1998 | Gonzalez | |
| 6,360,857 | B1 | 3/2002 | Fox et al. | |
| 8,336,899 | B2 * | 12/2012 | Soggio ................... | B62K 25/08 280/283 |
| 9,758,210 | B2 | 9/2017 | Pye et al. | |
| 2020/0324849 | A1 | 10/2020 | Pye | |

FOREIGN PATENT DOCUMENTS

| | | | | |
|---|---|---|---|---|
| EP | 2186717 A1 * | 5/2010 | ............. | B62K 25/08 |
| EP | 2930094 B1 * | 5/2020 | ............... | B62K 3/02 |

* cited by examiner

*Primary Examiner* — Kevin Hurley
(74) *Attorney, Agent, or Firm* — ZIMMERMAN INTELLECTUAL PROPERTY SERVICES LLC

(57) ABSTRACT

A suspension fork assembly may comprise a fork comprising a steer tube and a spring assembly tube with a cap insert and an insert assembly and a damper assembly tube with a cap insert and an insert assembly and a leg for a spring assembly configured to be fit within the spring assembly tube of the fork and a leg for a damper assembly configured to be fit within the damper assembly tube of the fork; the fork may comprise a composite material such as a carbon-fiber material with components attached by an adhesive bond. The suspension fork assembly may be assembled by a process comprising the step of aligning at least two of the components. The suspension fork assembly may comprise an inverted fork with the leg for the spring assembly inserted within the spring assembly tube and the leg for the damper assembly inserted within the damper assembly tube.

20 Claims, 18 Drawing Sheets

SUSPENSION FORK ASSEMBLY

CROSS-REFERENCE TO RELATED APPLICATION

The present invention claims priority to and incorporates by reference U.S. Provisional Patent Application No. 63/358,805 titled "SUSPENSION FORK ASSEMBLY" filed Jul. 6, 2022.

FIELD

The present invention relates to a suspension fork assembly for a bicycle.

BACKGROUND

It is known to provide a suspension fork assembly for a bicycle.

It would be advantageous to provide an improved suspension fork assembly formed from a composite material such as carbon fiber.

It would be advantageous to provide an improved suspension fork assembly formed from a carbon fiber material and providing a configuration for enhanced performance.

It would be advantageous to provide an improved suspension fork assembly comprising an improved piston assembly configuration.

It would be advantageous to provide an improved suspension fork assembly formed from a carbon fiber material and providing a configuration for enhanced mechanical performance.

It would be advantageous to provide an improved suspension fork assembly formed from a carbon fiber material and providing a configuration for enhanced aerodynamic performance.

It would be advantageous to provide a method for producing an improved suspension fork assembly formed from a carbon fiber material.

It would be advantageous to provide a tool to insert/adjust and remove a piston assembly in an improved suspension fork assembly.

SUMMARY

The present invention relates to a method of assembling a suspension fork assembly comprising components comprising a fork comprising a steer tube and a spring assembly tube with an insert assembly and a leg for a spring assembly and a damper assembly tube with an insert assembly and a leg for a damper assembly; the method may comprise the steps of (a) preparing each insert assembly for bonding with an adhesive bond; (b) applying adhesive to each insert assembly to provide the adhesive bond; (c) installing each insert assembly for the fork; (d) aligning at least two of the components comprising the fork in a fixture; (e) curing the adhesive bond for each insert assembly; the fork may comprise a composite material; the leg for the spring assembly may be configured to be fit within the spring assembly tube; the leg for the damper assembly may be configured to be fit within the damper assembly tube. The fixture may be configured for axial parallel alignment of the insert assembly in the spring assembly tube with the insert assembly in the damper assembly tube. The fork may comprise a cap insert; the method may further comprise the steps of preparing the cap insert for an adhesive bond in the fork and applying adhesive to the cap insert for the adhesive bond in the fork and attaching the cap insert in the fork with the adhesive bond before placing the fork in the fixture and curing the adhesive bond for the cap insert before removing the fork from the fixture. The cap insert may comprise a cap insert for the spring assembly tube and a cap insert for the damper assembly tube; further comprising the step of installing the cap insert for the spring assembly tube into the spring assembly tube with an adhesive bond and installing the cap insert for the damper assembly tube into the damper assembly tube with an adhesive bond. The fixture may be configured to axially align the cap insert with the insert assembly in the spring assembly tube. The fixture may be configured to co-axially align the cap insert with the insert assembly in the spring assembly tube and to co-axially align the cap insert with the insert assembly in the damper assembly tube and to axially align the cap insert and the insert assembly in the spring assembly tube with the cap insert and the insert assembly in the damper assembly tube. The fixture may be configured to axially align the steer tube with the insert assembly in the spring assembly tube and to axially align the steer tube with the insert assembly in the damper assembly tube. The steps of preparing the steer tube for bonding to the fork and applying adhesive to the steer tube for an adhesive bond and attaching the steer tube to the fork with the adhesive bond before placing the fork in the fixture and curing the adhesive bond for the steer tube before removing the fork from the fixture. The fixture may be configured to axially align the steer tube with the insert assembly in the spring assembly tube and to axially align the steer tube with the insert assembly in the damper assembly tube. The fork and the steer tube comprise a carbon fiber material.

The present invention relates to a suspension fork assembly comprising: (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork; the fork may comprise a composite material; the fork may be configured to be assembled with alignment of the spring assembly tube and/or the damper assembly tube. The suspension fork assembly may comprise an adhesive bond for the steer tube of the fork and/or an adhesive bond for the cap insert for the spring assembly tube of the fork and/or an adhesive bond for the cap insert for the damper assembly tube of the fork and/or an adhesive bond for the insert assembly for the spring assembly tube of the fork and/or an adhesive bond for the insert assembly for the damper assembly tube of the fork. The insert assembly in the spring assembly tube may be axially aligned with the insert assembly in the damper assembly tube. The cap insert in the damper assembly tube may be co-axially aligned with the insert assembly in the damper assembly tube. The cap insert in the spring assembly tube may be co-axially aligned with the insert assembly in the spring assembly tube and the cap insert in the damper assembly tube may be co-axially aligned with the insert assembly in the damper assembly tube and the insert assembly in the spring assembly tube may be axially aligned in parallel with the insert assembly in the damper assembly tube. The steer tube may be axially aligned in parallel with the cap insert in the spring assembly tube and the steer tube may be axially aligned in parallel with the cap insert in the damper assembly tube. The steer tube may be axially aligned in parallel with the insert assembly in the spring assembly tube and the steer tube may be axially aligned in parallel with the insert assembly in the damper assembly tube. The steer tube may be axially aligned in parallel with the cap insert in the spring assembly tube and the steer tube may be axially aligned in parallel with the cap insert in the damper assembly tube. The insert assembly may comprise a bushing and a seal. The steer tube may comprise a composite material.

The present invention relates to a method of assembling a suspension fork assembly comprising components comprising a steer tube and a spring assembly tube with a cap insert and a damper assembly tube with a cap insert with a leg for a spring assembly configured to be fit within the spring assembly tube of the fork and a leg for a damper assembly configured to be fit within the damper assembly tube of the fork; the method may comprise the steps of: (a) preparing each cap insert for bonding; (b) applying adhesive to each cap insert for an adhesive bond; (c) installing each cap insert to the fork; (d) aligning at least two of the components in a fixture; (c) curing each adhesive bond for each cap insert. The step of installing each cap insert for the fork may comprise installing the cap insert for the spring assembly tube into the spring assembly tube with the adhesive bond and installing the cap insert for the damper assembly tube into the damper assembly tube with the adhesive bond. The method may comprise the steps of preparing a steer tube for bonding to the fork and applying adhesive to the steer tube for an adhesive bond, attaching the steer tube to the fork with the adhesive bond before placing the fork in the fixture, and curing the adhesive bond for the steer tube before removing the fork from the fixture. The steer tube may comprise a composite material. The fork may comprise an insert assembly and the method further may comprise the steps of preparing the insert assembly for bonding to the fork and applying adhesive to the insert assembly for an adhesive bond, attaching the insert assembly to the fork with the adhesive bond before placing the fork in the fixture, and curing the adhesive bond for the insert assembly before removing the fork from the fixture. The method may comprise the step of attaching each insert assembly to the fork may comprise installing the insert assembly for the spring assembly tube into the spring assembly tube with the adhesive bond and installing the insert assembly for the damper assembly tube into the damper assembly tube with the adhesive bond. The fixture may be configured to align the steer tube, the insert assembly in the spring tube, and the insert assembly in the damper tube. The fixture may be configured to align the cap insert in the spring tube and the insert assembly in the spring tube. The fixture may be configured to align the cap insert in the damper tube and the insert assembly in the damper tube. The fixture may be configured to align the cap insert in the spring tube and the cap insert in the damper tube. The fixture may be configured to align the insert assembly in the spring tube and the insert assembly in the damper tube. The fixture may be configured to align the cap insert in the spring tube, the cap insert in the damper tube, the insert assembly in the spring tube, and insert assembly in the damper tube. The fixture may be configured to align the steer tube, the cap insert in the spring tube, the cap insert in the damper tube, the insert assembly in the spring tube, and insert assembly in the damper tube. The insert assembly may comprise a bushing and a seal. The insert assembly may comprise an upper bushing, a lower bushing, a foam ring, and a dust seal. A suspension fork assembly may comprise an inverted fork. A suspension fork assembly may comprise a composite material; the composite material may comprise a carbon fiber material.

The present invention relates to a suspension fork assembly comprising (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork.

The present invention relates to a suspension fork assembly comprising (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork; the cap insert for the spring assembly tube may be aligned with the fork and attached by an adhesive bond; the cap insert for the damper assembly tube may be aligned with the fork and attached by an adhesive bond.

The present invention relates to a suspension fork assembly comprising (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork; the cap insert for the spring assembly tube may be aligned with the steer tube for the fork and attached by an adhesive bond; the cap insert for the damper assembly tube may be aligned with the steer tube for the fork and attached by an adhesive bond.

The present invention relates to a suspension fork assembly comprising a fork comprising a steer tube and a spring assembly tube with an insert assembly and a leg for a spring assembly and a damper assembly tube with an insert assembly and a leg for a damper assembly; the leg for the spring assembly may be configured to be fit within the spring assembly tube; the leg for the damper assembly may be configured to be fit within the damper assembly tube.

The present invention relates to a suspension fork assembly comprising a fork comprising a steer tube and a spring assembly tube with an insert assembly and a leg for a spring assembly and a damper assembly tube with an insert assembly and a leg for a damper assembly; the leg for the spring assembly may be configured to be fit in alignment within the spring assembly tube; the leg for the damper assembly may be configured to be fit in alignment within the damper assembly tube.

The present invention relates to a method of assembling a suspension fork assembly comprising a fork comprising a steer tube and a spring assembly tube with an insert assembly and a leg for a spring assembly and a damper assembly tube with an insert assembly and a leg for a damper assembly; the method may comprise the steps of (a) preparing each insert assembly for bonding with an adhesive bond; (b) applying adhesive to each insert assembly to provide the adhesive bond; (c) installing each insert assembly for the fork; (d) aligning at least two of the components comprising the fork in a fixture; (c) curing the adhesive bond for each insert assembly; the fork may comprise a composite material; the leg for the spring assembly may be configured to be fit within the spring assembly tube; the leg for the damper assembly may be configured to be fit within the damper assembly tube. The fixture may be configured for alignment of the insert assembly in the spring assembly tube and for alignment of the insert assembly in the damper assembly tube. The fixture may be configured to axially align the cap insert in the spring assembly tube and to axially align the insert assembly in the spring assembly tube. The cap insert in the damper assembly tube and the insert assembly in the damper assembly tube are aligned. The step of installing each insert assembly for the fork may comprise installing the insert assembly for the spring assembly tube into the spring assembly tube with the adhesive bond and installing the insert assembly for the damper assembly tube into the damper assembly tube with the adhesive bond. The fork may comprise a composite material. The composite material may comprise a non-metallic material. The composite material may comprise a carbon-fiber material. The fixture may be configured to co-axially align the cap insert with the insert assembly in the spring assembly tube and to co-axially align the cap insert with the insert assembly in the damper assembly tube and to axially align in parallel the cap insert and the insert assembly in the spring assembly tube with the cap insert and the insert assembly in the damper assembly tube. The fixture may be configured to align the steer tube and the cap insert in the spring assembly tube and the cap insert in the damper assembly tube and the insert assembly in the spring assembly tube and the insert assembly in the damper assembly tube.

The present invention relates to a suspension fork assembly comprising a fork comprising a steer tube and a spring assembly tube with a cap insert and an insert assembly for a spring assembly and a damper assembly tube with a cap insert and an insert assembly for a damper assembly; a leg for the spring assembly configured to be fit within the spring assembly tube of the fork; a leg for the damper assembly configured to be fit within the damper assembly tube of the fork; the fork may comprise a composite material. The suspension fork assembly may comprise the steer tube aligned with the spring assembly tube and aligned with the damper assembly tube; the suspension fork assembly may comprise a cap insert aligned in the spring assembly tube of the fork and attached by an adhesive bond and a cap insert aligned in the damper assembly tube of the fork and attached by an adhesive bond. The insert assembly in the spring assembly tube and the insert assembly in the damper assembly tube are aligned in parallel axial alignment. The insert assembly in the spring assembly tube may be axially aligned in parallel with the insert assembly in the damper assembly tube. The cap insert in the damper assembly tube may be axially aligned with the insert assembly in the damper assembly tube. The cap insert in the damper assembly tube and the insert assembly in the damper assembly tube are aligned in parallel axial alignment. The steer tube and the cap insert in the spring assembly tube and the cap insert in the damper assembly tube and the insert assembly in the spring assembly tube and insert assembly in the damper assembly tube are aligned. The fork may comprise a composite material. The composite material may comprise a carbon fiber material. The fork of the suspension fork assembly may comprise a pitch/distance; a pitch/distance may be provided between the spring assembly tube and the damper assembly tube; by maintaining the alignment of components during bonding/attachment in the fixture a pitch/distance of components may be maintained for the suspension fork assembly; components assembled for the fork may be aligned at a uniform/determined pitch/distance for the suspension fork assembly.

The present invention relates to a suspension fork assembly; the suspension fork assembly may comprise a fork comprising a steer tube and a spring assembly tube with a cap insert and an insert assembly and a damper assembly tube with a cap insert and an insert assembly; a spring assembly may be configured to be fit within the leg provided by the spring assembly tube of the fork; a damper assembly configured to be fit within the leg provided by the damper assembly tube of the fork; the fork may comprise a composite material such as a carbon-fiber material.

The suspension fork assembly may comprise an inverted fork with the leg for the spring assembly inserted within the spring assembly tube and the leg for the damper assembly inserted within the damper assembly tube; the steer tube may comprise a carbon-fiber material. The steer tube may have a tapered inner wall. The steer tube may have a tapered inner wall and the steer tube has a tapered outer wall. The steer tube may be attached to the fork by an adhesive bond. The leg for the spring assembly may comprise a tube. The leg for the damper assembly may comprise a tube. The cap insert may comprise a metal material; the cap insert may comprise an aluminum material. The cap insert may be bonded to the fork. The cap insert for the spring assembly tube may be attached to the fork by an adhesive bond. The cap insert for the damper assembly tube may be attached to the fork by an adhesive bond. The adhesive bond may comprise an adhesive that is cured to form the adhesive bond. The cap insert for the spring assembly tube may be attached to the fork by an adhesive bond; the cap insert for the damper assembly tube may be attached to the fork by an adhesive bond. The steer tube may comprise a steerer. The insert assembly may comprise a bushing. The insert assembly may comprise a seal. The seal may comprise a dust seal. The insert assembly may comprise a bushing and a dust seal. The insert assembly may comprise an upper bushing, a lower bushing, a foam ring, and a dust seal. The suspension fork assembly may comprise a damper assembly within the damper assembly tube comprising a piston assembly. The piston assembly may be retained within damper assembly tube by friction. The piston assembly may comprise a first piston and a second piston. The piston assembly may comprise a piston spacer and a glide ring. One piston may have a glide ring; the glide ring may be configured to provide a seal for a fluid path through both pistons. The first piston may be a compression piston; the second piston may be a rebound piston. The spring assembly tube may comprise an aerodynamic profile configured to provide less aerodynamic drag than a circular profile.

The present invention relates to a suspension fork assembly comprising a leg and a damper assembly within the leg comprising a cartridge; the cartridge may be attached within the leg for the damper assembly at one end and unattached at the other end. The leg may comprise a damper assembly tube; the cartridge may be suspended within the leg for the damper assembly. The cartridge may be suspended at a top end within the leg for the damper assembly. The suspension fork assembly may comprise a spring assembly. The spring assembly may comprise an air spring. The damper assembly may comprise a piston assembly. The damper assembly may comprise a floating piston. The floating piston may comprise a seal. The piston assembly may comprise a glide ring. The glide ring may be configured to provide a seal for a fluid path through the piston assembly. The piston assembly may comprise a first piston and a second piston. The first piston may be a compression piston. The second piston may be a rebound piston. The piston spacer may contain fluid. A flow control element for the damper assembly may comprise at least one shim. One piston may have a glide ring. The glide ring may be configured to provide a seal for a fluid path through the first piston and the second piston. The cartridge of the damper assembly may be configured for a piston assembly comprising an internal floating piston; the cartridge may comprise a cartridge tube.

The present invention relates to a piston assembly for a damper assembly of a suspension fork assembly comprising a first piston and a second piston and a piston spacer and a glide ring. One piston may have a glide ring. The glide ring may be configured to provide a seal for a fluid path through both pistons. The first piston may be a compression piston. The second piston may be a rebound piston. The piston spacer may contain the fluid path. A flow control element for the damper assembly may comprise at least one shim.

The present invention relates to a method of assembling a suspension fork assembly comprising a carbon-fiber fork comprising a steer tube and a spring assembly tube with a cap insert and a damper assembly tube with a cap insert with a leg for a spring assembly configured to be fit within the spring assembly tube of the fork and a leg for a damper assembly configured to be fit within the damper assembly tube of the fork comprising the steps of preparing each cap insert for bonding and applying adhesive to each cap insert for an adhesive bond and installing each cap insert to the fork and curing each adhesive bond for each cap insert.

The method may comprise the steps of placing the fork in a fixture and removing the fork from the fixture. The method may comprise the steps of placing the fork in a fixture after installing each cap insert to the fork and removing the fork from the fixture after curing each adhesive bond for each cap insert. The step of installing each cap insert for the fork may comprise installing the cap insert for the spring assembly tube into the spring assembly tube with the adhesive bond. The step of installing each cap insert for the fork may comprise installing the cap insert for the damper assembly tube into the damper assembly tube with the adhesive bond. The step of installing each cap insert for the fork may comprise installing the cap insert for the spring assembly tube into the spring assembly tube with the adhesive bond and installing the cap insert for the damper assembly tube into the damper assembly tube with the adhesive bond. The method may comprise the step of providing the leg for the spring assembly inserted within the suspension assembly tube. The method may comprise the step of providing the leg for the damper assembly inserted within the damper assembly tube. The method may comprise the step of preparing the steer tube for bonding to the fork and applying adhesive to the steer tube for an adhesive bond. The method may comprise the step of attaching the steer tube to the fork with the adhesive bond. The method may comprise the step of curing the adhesive bond for the steer tube. The method may comprise the step of placing the fork in a fixture after attaching the steer tube. The method may comprise the step removing the fork from the fixture after curing the adhesive bond for the steer tube. The steer tube may comprise a carbon-fiber material. The steer tube may comprise a steerer. The fork may comprise an insert assembly.

The method may comprise the step of preparing the insert assembly for bonding to the fork and applying adhesive to the insert assembly for an adhesive bond. The method may comprise the step of attaching the insert assembly to the fork with the adhesive bond. The method may comprise the step of curing the adhesive bond for the insert assembly. The method may comprise the step of placing the fork in a fixture after attaching the insert assembly. The method may comprise the step removing the fork from the fixture after curing the adhesive bond for the insert assembly. The step of installing each insert assembly for the fork may comprise installing the insert assembly for the spring assembly tube into the spring assembly tube with the adhesive bond. The step of installing each insert assembly for the fork may comprise installing the insert assembly for the damper assembly tube into the damper assembly tube with the adhesive bond. The step of installing each insert assembly for the fork may comprise installing the insert assembly for the spring assembly tube into the spring assembly tube with the adhesive bond and installing the insert assembly for the damper assembly tube into the damper assembly tube with the adhesive bond. The fixture may be configured to align the steer tube and the cap insert in the spring tube. The fixture may be configured to align the steer tube and the insert assembly in the spring tube. The fixture may be configured to align the cap insert in the spring tube and the insert assembly in the spring tube. The fixture may be configured to align the cap insert in the spring tube and the cap insert in the damper tube. The fixture may be configured to align the insert assembly in the spring tube and the insert assembly in the damper tube. The fixture may be configured to align the cap insert in the spring tube, the cap insert in the damper tube, the insert assembly in the spring tube, and insert assembly in the damper tube. The fixture may be configured to align the steer tube, the cap insert in the spring tube, the cap insert in the damper tube, the insert assembly in the spring tube, and insert assembly in the damper tube. The insert assembly may comprise a bushing. The insert assembly may comprise a seal. The seal may comprise a dust seal. The insert assembly may comprise a bushing and a dust seal. The insert assembly may comprise an upper bushing, a lower bushing, a foam ring, and a dust seal.

The present invention relates to a suspension fork assembly comprising a spring assembly tube and a damper assembly tube; the spring assembly tube may comprise a profile; the profile may comprise an aerodynamic profile configured to provide less aerodynamic drag than a circular profile. The damper assembly tube of the fork may comprise a profile; the profile may comprise an aerodynamic profile configured to provide less aerodynamic drag than a circular profile. The aerodynamic profile may comprise a generally D-shaped profile. The aerodynamic profile may comprise a Kamm tail. The aerodynamic profile of the spring assembly tube produces drag force of less than 75 percent of drag force of a circular profile tube at 30 mph. The aerodynamic profile may provide a drag force of less than 1 N at 30 mph.

The present invention relates to a tool configured for engagement of a piston assembly of a damper assembly for a leg of a suspension fork assembly comprising a base and a first end configured to engage the piston assembly and a second end configured to engage the piston assembly and a collar configured to fit on the body with indicia configured to indicate position of the collar on the body. The piston assembly may be retained within the leg for the damper assembly by friction. The collar may be configured to be secured to the body to determine position of installation of the piston assembly within the leg. The indicia may be used to indicate position of installation of the piston assembly within the leg. The tool may comprise a body comprising the base and the first end and the second end. The first end may comprise a projection and a recess. The first end may be configured to retain the piston assembly for installation within the leg. The second end may comprise a projection and a recess. The second end may comprise a feature configured to engage the piston assembly for removal from the leg. The second end may comprise a feature configured to attach to the piston assembly for removal from the leg. The second end of the tool may be configured to attach to the piston by rotation. The collar may be secured to the body by a fastener. The indicia may comprise a scale.

The present invention relates to a suspension fork assembly comprising a fork comprising a steer tube and a spring assembly tube with a cap insert and an insert assembly and a damper assembly tube with a cap insert and an insert assembly; a leg may be provided for a spring assembly configured to be fit within the spring assembly tube of the fork; a leg may be provided for a damper assembly configured to be fit within the damper assembly tube of the fork; the fork may comprise a composite material. The suspension fork assembly may comprise an inverted fork with the leg for the spring assembly inserted within the spring assembly tube and the leg for the damper assembly inserted within the damper assembly tube. The composite material comprises a carbon fiber material.

FIGURES

DESCRIPTION

Figure 1:
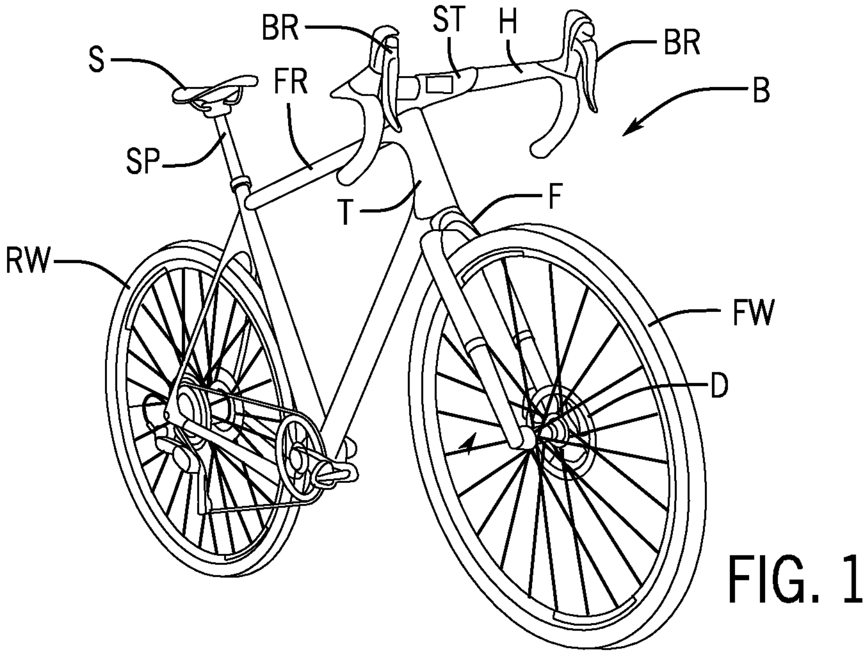
FIG. 1 is a schematic perspective view of a bicycle according to an exemplary embodiment.
Figure 2:
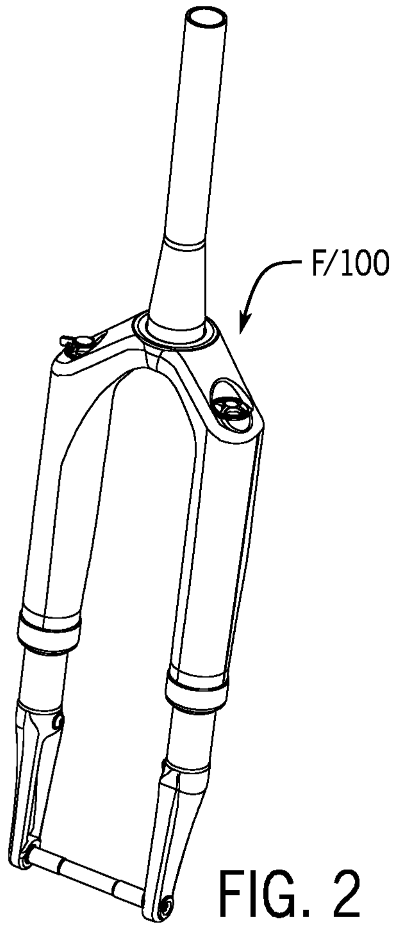
FIG. 2 is a schematic perspective view of a suspension fork assembly according to an exemplary embodiment.

Referring to FIG. 1, a bicycle B is shown schematically according to an exemplary embodiment providing an arrangement of parts/components including a frame FR with a head tube T and a seat post SP (with seat S) and a set of wheels comprising front wheel FW with a front fork/suspension assembly F/100 and rear wheel RW coupled to the frame FR (through a suspension system) and a set of pedals; the bicycle provides handlebar H (coupled to front wheel FW through stem ST and front fork assembly F/100 and through head tube T) with controls for a brake system BR coupled to a brake disc D (e.g. rotor at/on each of front wheel FW and rear wheel RW) and a gear/shift control (coupled to a selectable gear system for rear wheel RW).

According to an exemplary embodiment, a suspension system for bicycle B shown as comprising suspension/fork assembly F/100 (e.g. for the front fork of the bicycle) is configured to provide suspension damping for the bicycle B in operation.

As shown schematically according to an exemplary embodiment in FIGS. 2, 3A-3B, 4, 5, 6, 7, 8 and 9, the front suspension fork assembly F/100 comprises a set of legs 102 and 104 and an axle 106 and a crown steer unit 110 comprising a steer tube 118 and a tube configuration 112 with a spring assembly tube 112*a* and a damper assembly tube 112*b*; spring assembly tube 112*a* is configured for assembly with insertion of leg 102 with spring assembly shown as an air spring assembly 130 and with cap insert 116 and an air cap 132 and an insert assembly 120; damper assembly tube 112*b* is configured for assembly with insertion of leg 104 with a damper assembly 140 and with cap insert 116 and adjuster knob 142 and insert assembly 120. As indicated schematically in FIGS. 5, 6, 7, 8 and 9, tube configuration 112 with spring assembly tube 112*a* and damper assembly tube 112*b* may comprise a composite material CM such as a carbon-fiber material; cap inserts 116 and steer tube 118 and insert assemblies 120 may be attached for the tube configuration with an adhesive material AD.

As shown schematically in FIGS. 4, 5, 7, 8, 9, 10, 11 and 12, an insert assembly 120 may comprise an insert 122 and a set of bushings comprising upper bushing 124 and lower bushing 125 with a ring 126 and seal shown as dust seal 128.

As shown schematically in FIGS. 4, 14, 15A-15C and 16A-16B, damper assembly tube 112*b* with damper assembly 140 may comprise a piston assembly 150 comprising a cartridge/cartridge tube 141 and a set of pistons comprising a compression piston 156 and a rebound piston 158 with a piston spacer 152 and a spring shown as compression/wave spring 155 and a ring shown as glide ring 160; flow control elements shown as a set of shims comprising shim 146 and shim 148 and shim 154 and shim 162 and shim 164 and shim 166 may be provided along with a nut 168 to secure onto a piston seat 144.

As shown schematically in FIGS. 14, 15A-15C and TABLE A, damper assembly 140 comprises a fluid damper configuration (e.g. containing a hydraulic/suspension fluid); operation of damper assembly 140 comprises a state of compression for assembly under an input load (e.g. light, heavy) and state of rebound after the input load; setting of damper assembly 140 for operation comprises setting of position of a flow control element shown as a central needle 140*x* into and open state or closed state at the piston assembly to configure flow paths/passages for fluid. As shown schematically in FIGS. 15A-15C and 16A-16B, the damper assembly may comprise passages for fluid flow shown as passages P1/P2/P3/P4/P5/P6/P7/P8; a flow control arrangement for the damper assembly may comprise flow control elements such as at least one shim. See TABLE A.

Figure 3A:
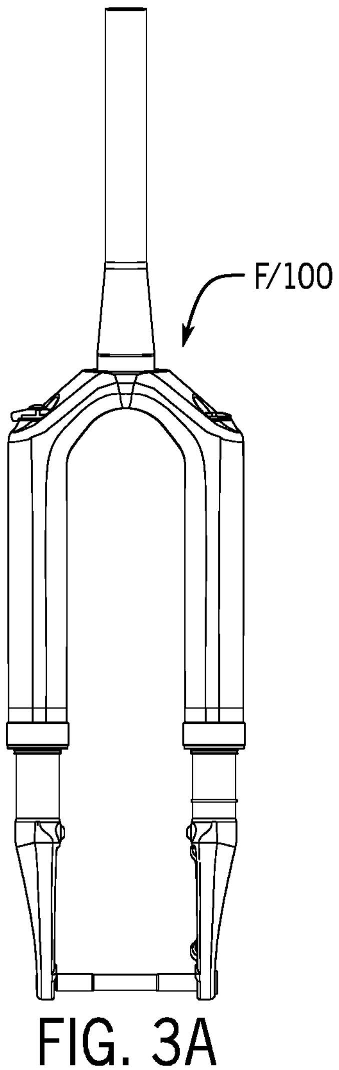
FIGS. 3A and 3B are schematic front views of a suspension fork assembly according to an exemplary embodiment.
Figure 3B:
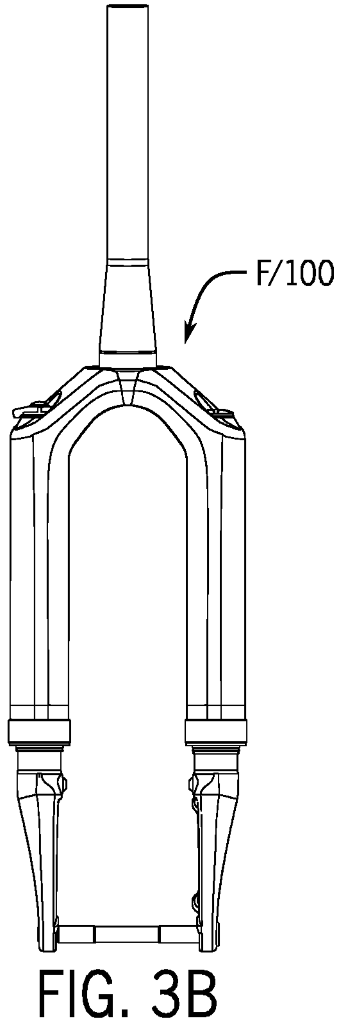
Figure 4:
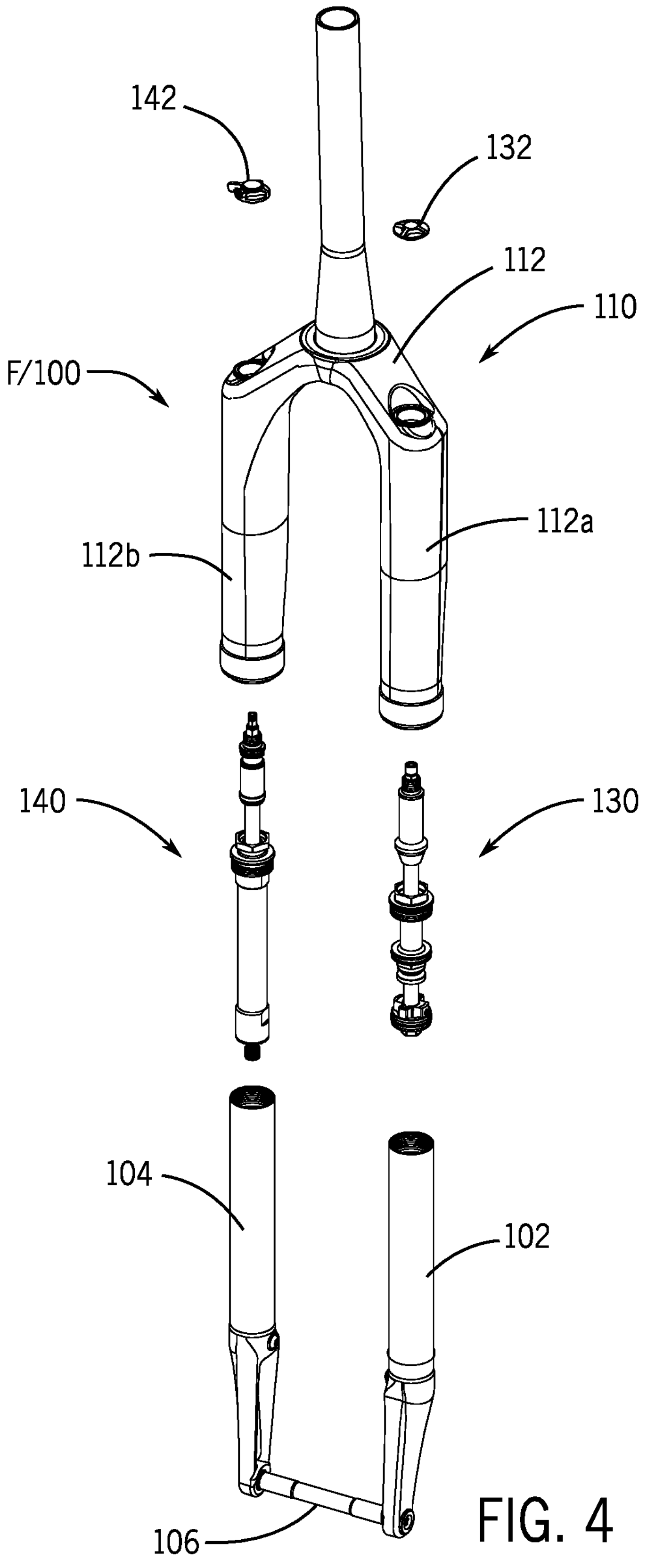
FIGS. 4 and 5 are schematic exploded perspective views of a suspension fork assembly according to an exemplary embodiment.
Figure 5:
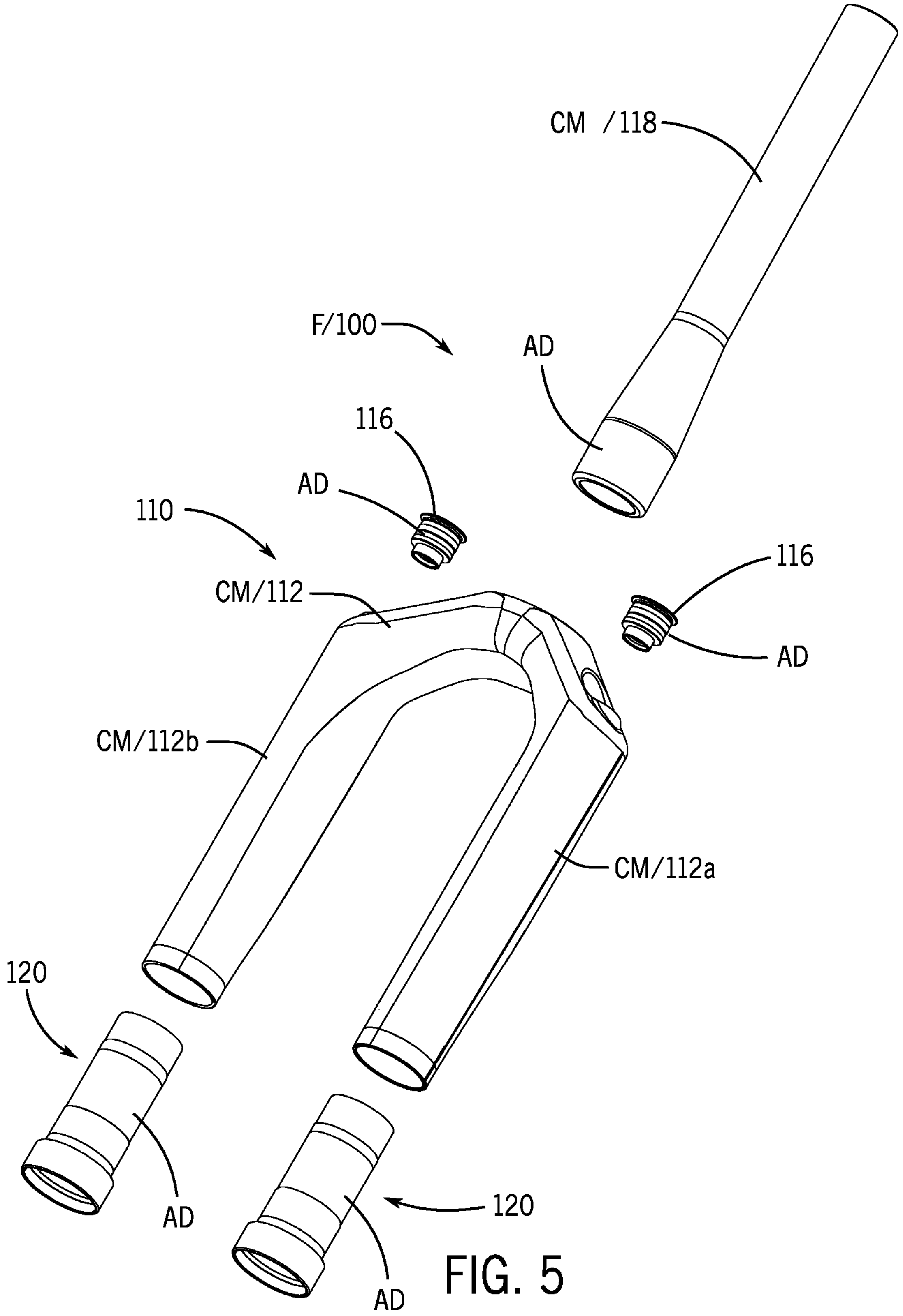
Figure 6:
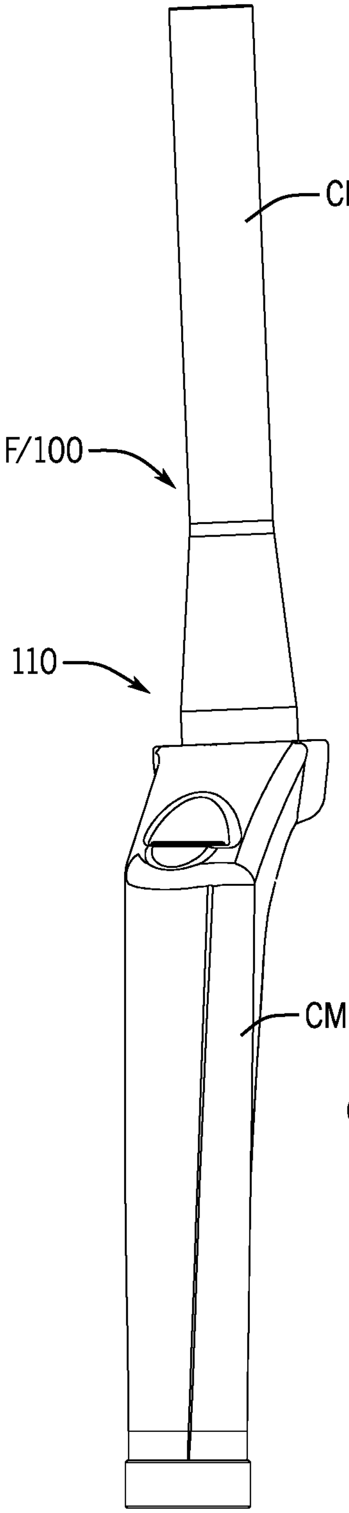
FIG. 6 is a schematic side view of a suspension fork assembly according to an exemplary embodiment.
Figure 7:
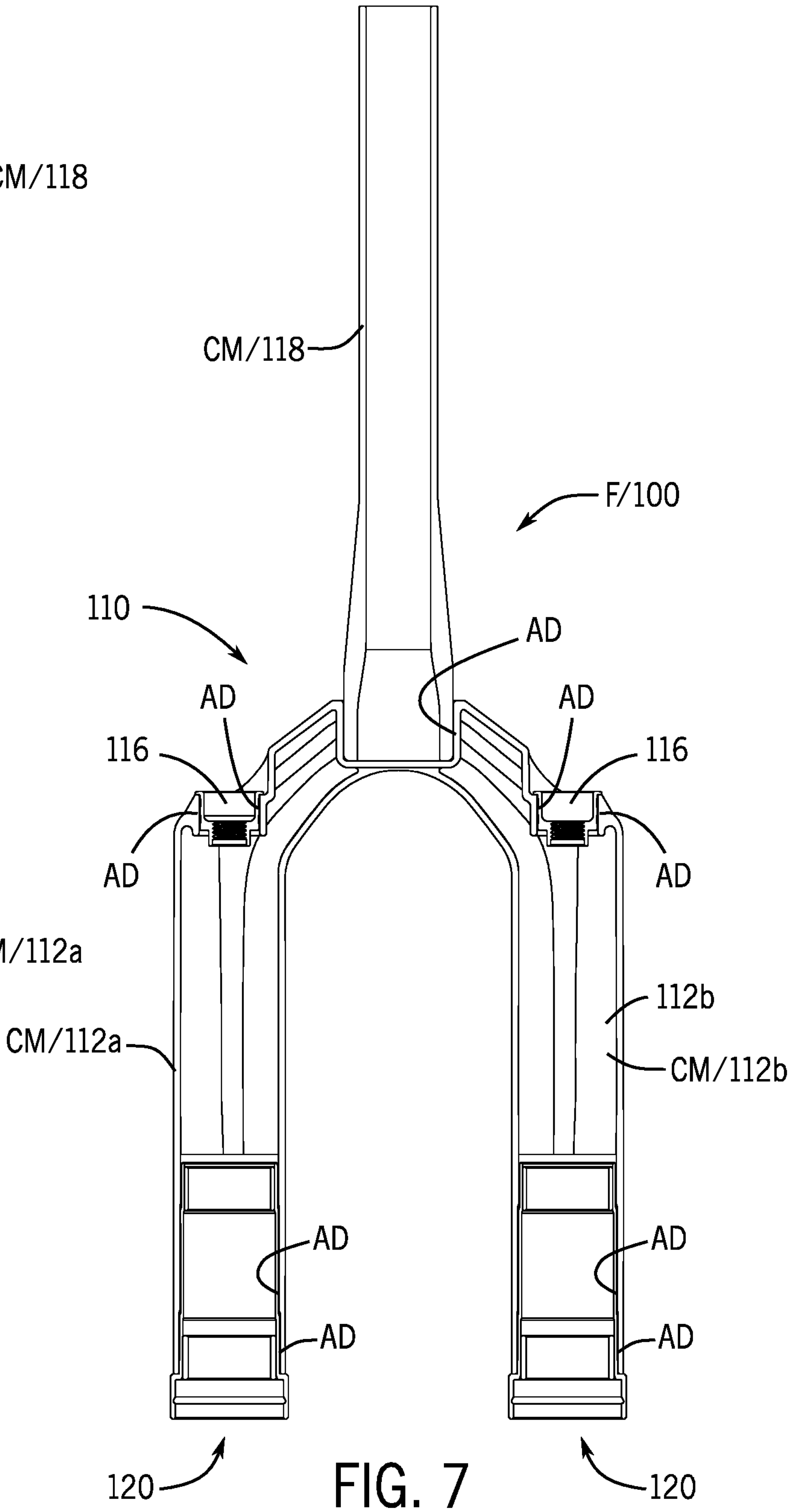
FIG. 7 is a schematic side cross-section view of a suspension fork assembly according to an exemplary embodiment.
Figure 8:
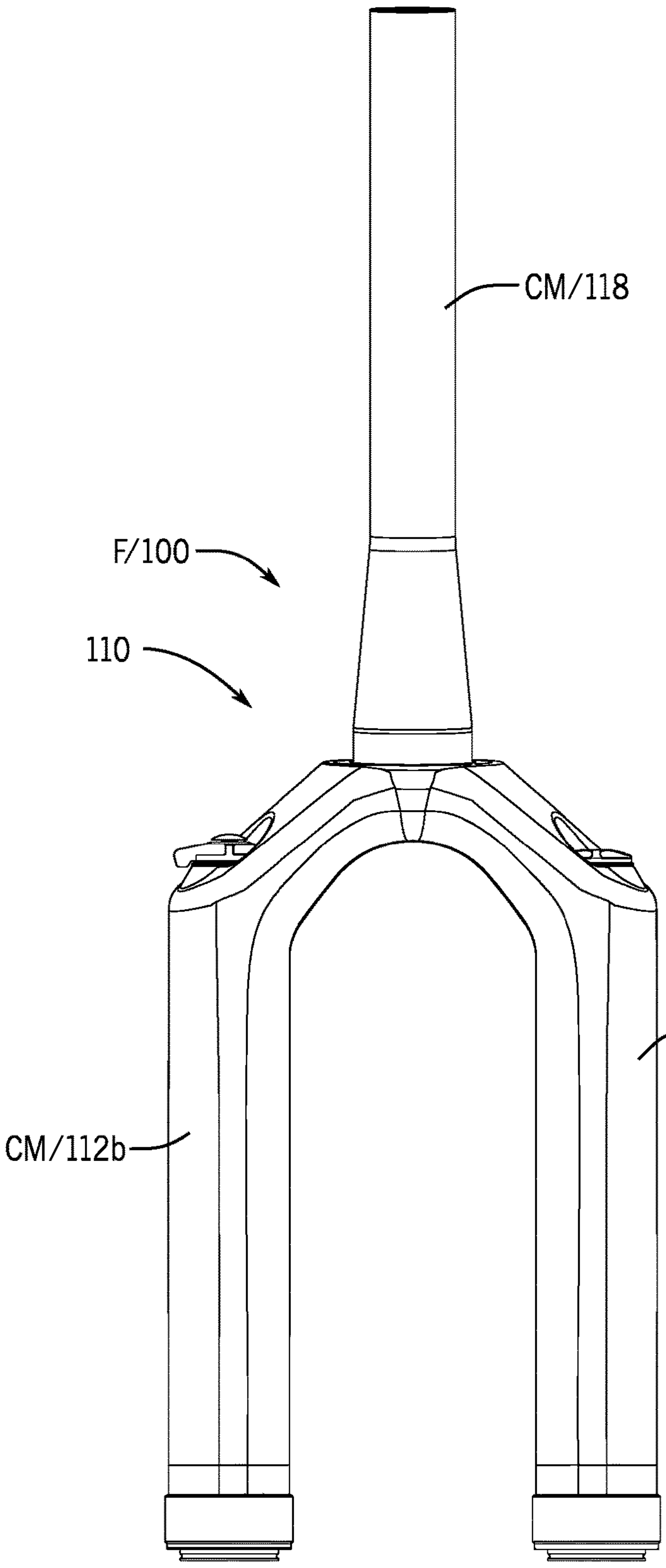
FIG. 8 is a schematic side view of a suspension fork assembly according to an exemplary embodiment.
Figure 9:
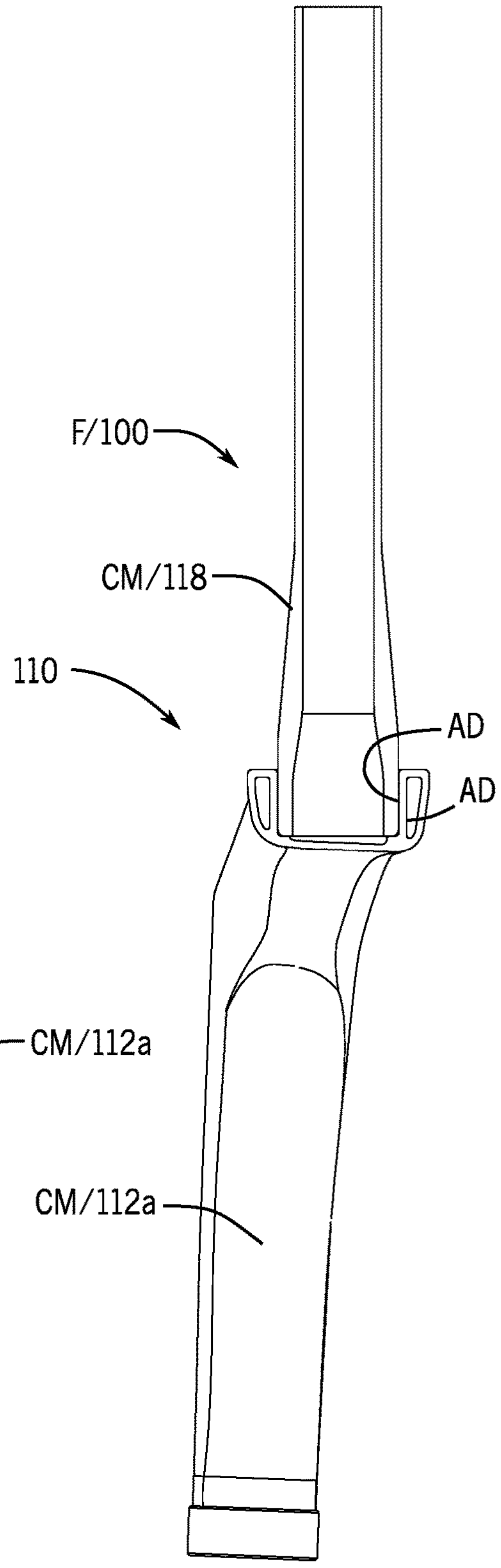
FIG. 9 is a schematic side cross-section view of a suspension fork assembly according to an exemplary embodiment.
Figure 10:
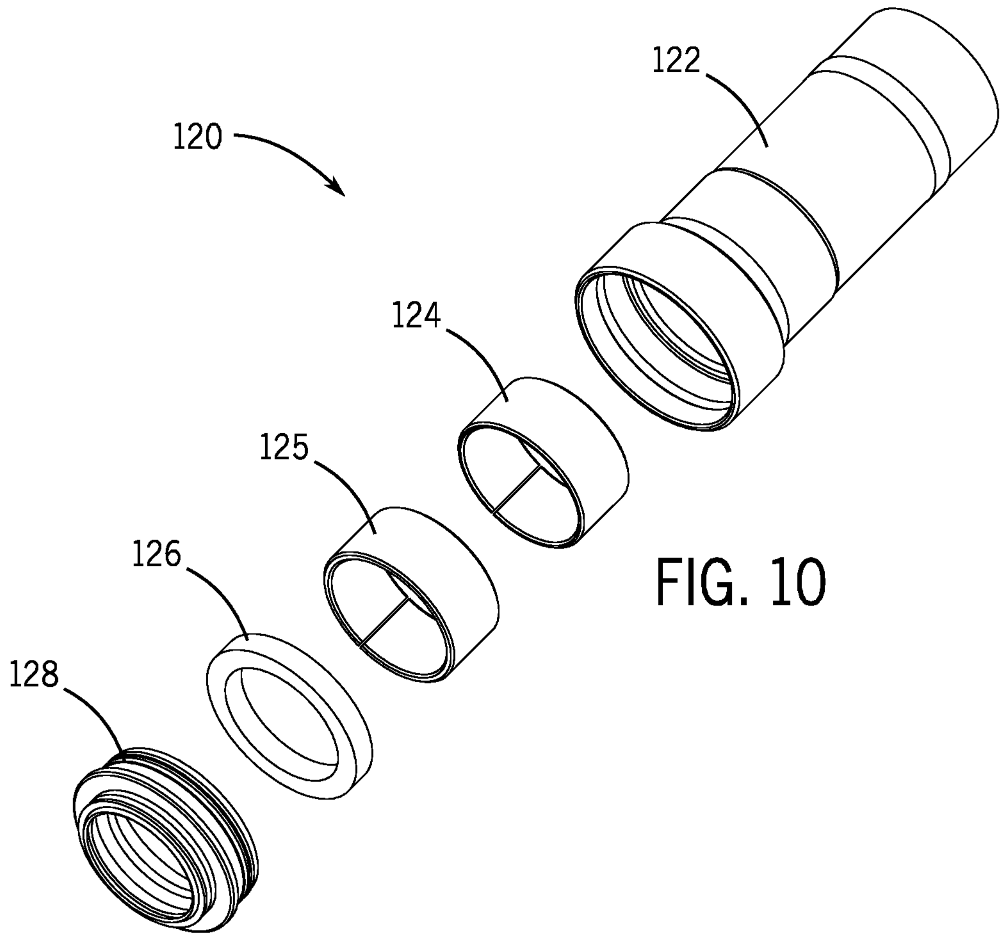
FIG. 10 is a schematic exploded perspective view of an insert assembly suspension fork assembly according to an exemplary embodiment.
Figure 11:
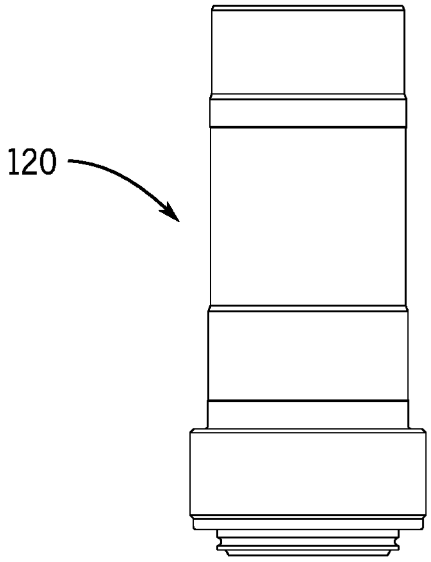
FIG. 11 is a schematic side view of an insert assembly of a suspension fork assembly according to an exemplary embodiment.
Figure 12:
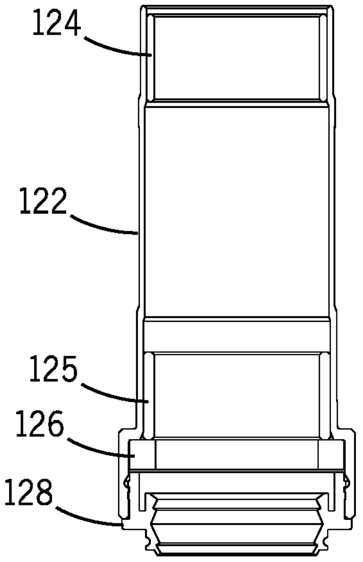
FIG. 12 is a schematic cross-section view of an insert assembly of a suspension fork assembly according to an exemplary embodiment.

As shown schematically according to an exemplary embodiment in FIGS. 1, 2, 3A-3B and TABLE A, in operation the suspension fork assembly F/100 provides a suspension system for the bicycle B; the damper assembly 140 of the suspension fork assembly F/100 is configured to facilitate flow of hydraulic/suspension fluid (e.g. a contained volume of fluid) to provide suspension damping between a default/extended condition (see FIG. 3A) and a compressed/shortened condition (see FIG. 3B) as the front wheel of the bicycle encounters irregularities (e.g. bumps, obstacles, holes, etc.). As indicated schematically in FIGS. 3A and 3B, in operation when the suspension system with suspension fork assembly with damper assembly is in use to provide suspension damping in response to an input (e.g. such as from an irregularity encountered by the front wheel) the suspension fork assembly F/100 will be compressed/shortened as indicated in FIG. 3B; after the input, the fork assembly F will return to a default/extended condition (e.g. ready to encounter input to provide suspension damping at the front wheel) as indicated in FIG. 3A.

As indicated schematically in FIGS. 1, 2, 3A-3B, 4, 14, 15A-15C and TABLE A, in operation the suspension fork assembly F/100 for a suspension system for the bicycle B will encounter a variety of types of input loads, such as very light/slight, light, heavy, etc.; the suspension fork assembly F/100 with damper assembly 140 is configured by design and with adjustment/configuration of flow control elements (e.g. needle position, shim elements, etc.) to provide efficient and effective suspension damping/response for each of a variety of types of input loads.

TABLE A

FLOW PATH/PASSAGE DAMPER ASSEMBLY

| State | Needle | Input Load | FIG. | Flow Path/Passage P1 | P2 | P3 | P4 | P5 | P6 | P7 | P8 |
|---|---|---|---|---|---|---|---|---|---|---|---|
| Compression | Closed | Light | | x | x | x | x | x | x | N/A | N/A |
| Compression | Closed | Heavy | | x | ○ | ○ | ○ | ○ | ○ | N/A | N/A |
| Compression | Open | Very Light | | ○ | x | x | x | ○ | ○ | N/A | N/A |
| Compression | Open | Light | | ○ | ○ | x | ○ | ○ | ○ | N/A | N/A |
| Compression | Open | Heavy | 15B | ○ | ○ | ○ | ○ | ○ | ○ | N/A | N/A |
| Rebound | Closed | N/A | | x | N/A | N/A | ○ | ○ | ○ | ○ | ○ |
| Rebound | Open | N/A | 15C | ○ | N/A | N/A | ○ | ○ | ○ | ○ | ○ |

○ = flow path/passage open
x = flow path/passage closed
N/A = not applicable

Exemplary Embodiments—A

According to an exemplary embodiment shown schematically in FIGS. 2, 3A-3B, 4, 5, 6, 7, 8, 9, 10, 11, 12, 14, 15A-15C and 16A-16B, a suspension fork assembly F/100 may comprise a fork comprising a steer tube 118 and a spring assembly tube 112*a* with a cap insert 116 and an insert assembly 122 and a damper assembly tube 112*b* with a cap insert 116 and an insert assembly 122; a spring assembly may be configured to be fit within the leg provided by the spring assembly tube 112*a* of the fork; a damper assembly 140 may be configured to be fit within the leg provided by the damper assembly tube 112*b* of the fork; the fork may comprise a composite material such as a carbon-fiber material.

Figure 13A:
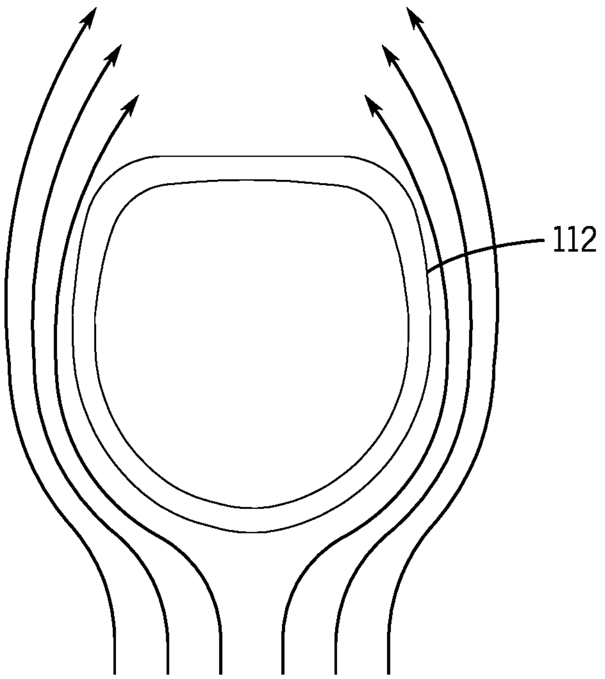
FIG. 13A is a schematic partial top plan view of an aerodynamic profile of a suspension fork assembly according to an exemplary embodiment.
Figure 13:
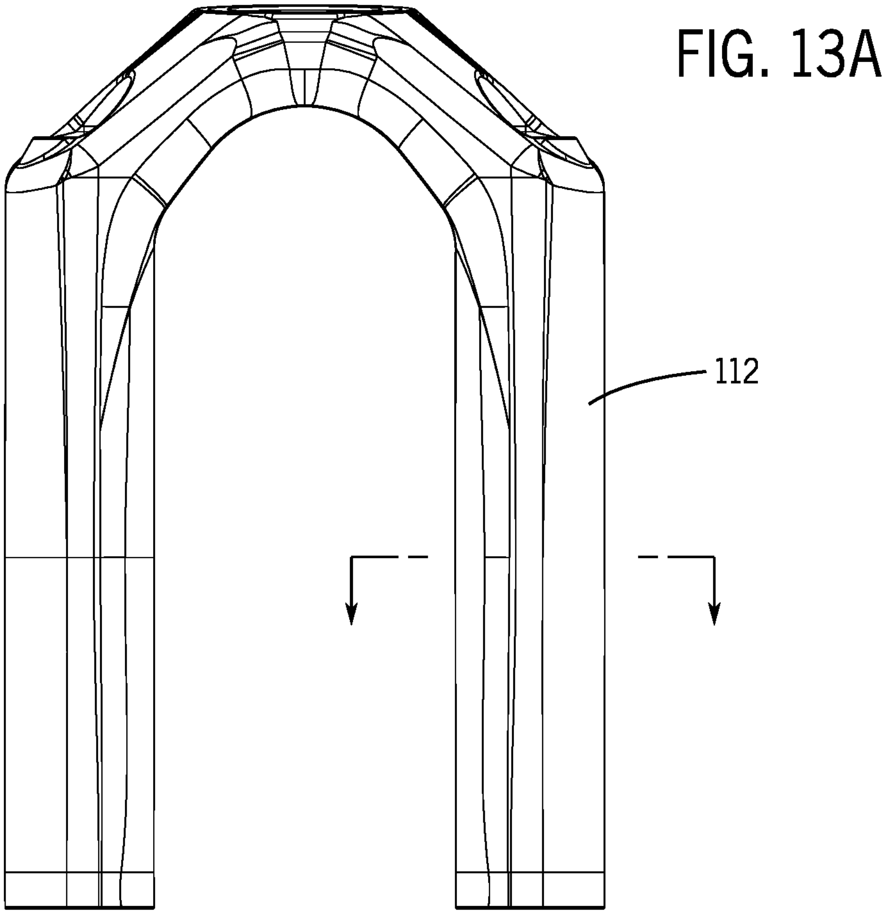
FIG. 13 is a schematic partial side view of a suspension fork assembly according to an exemplary embodiment.
Figure 14:
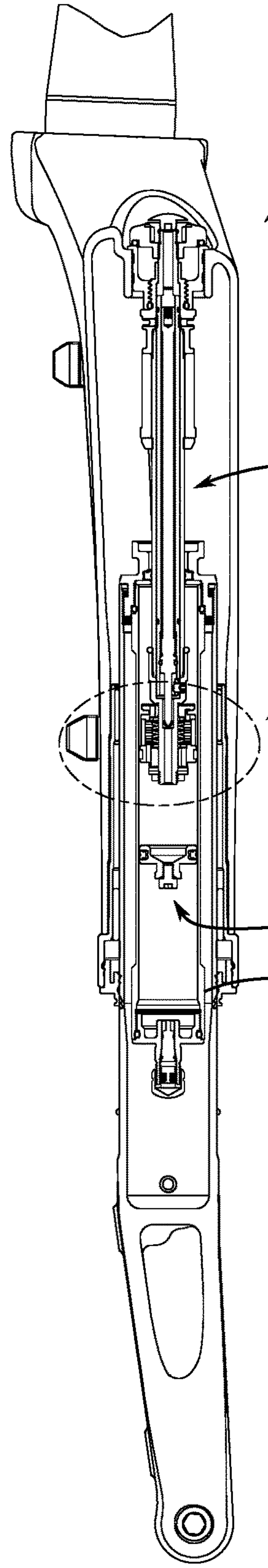
FIG. 14 is a schematic side cross-section view of a piston assembly showing a suspension fork assembly according to an exemplary embodiment.
Figure 15A:
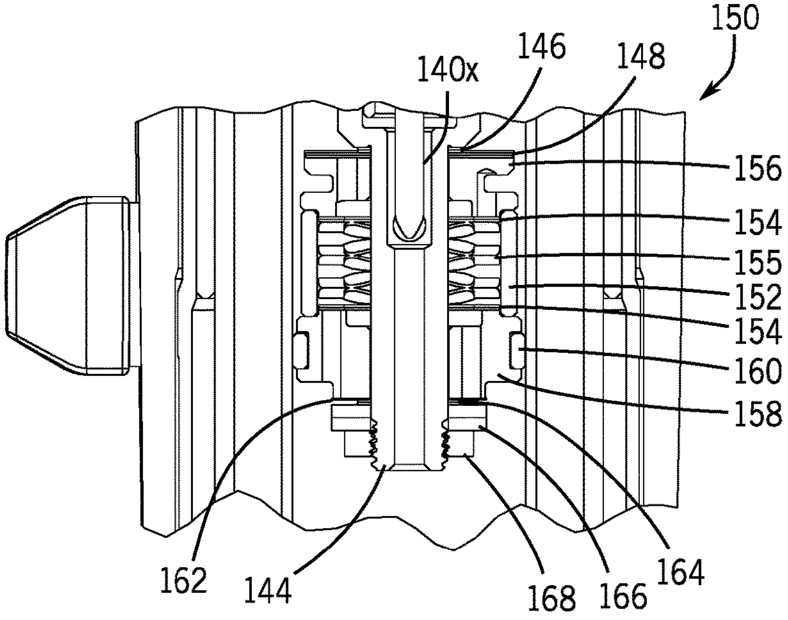
FIGS. 15A through 15C are schematic side cross-section views showing a piston assembly of a suspension fork assembly according to an exemplary embodiment.
Figure 15B:
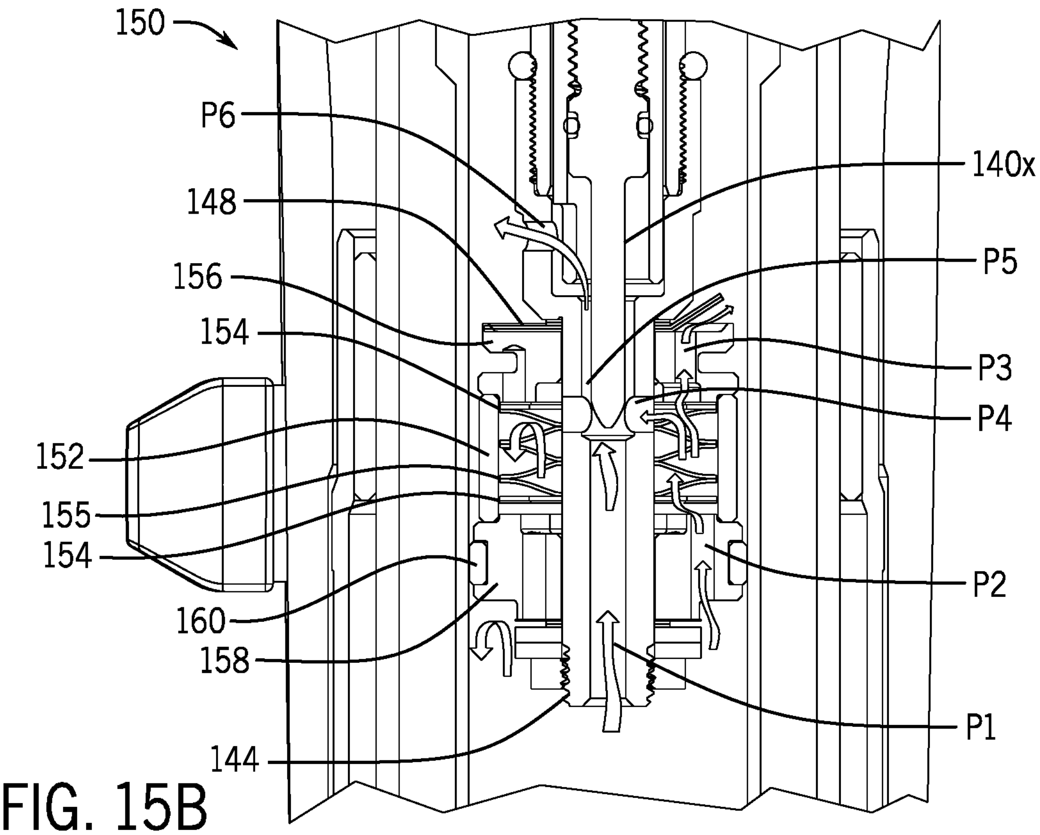
Figure 15C:
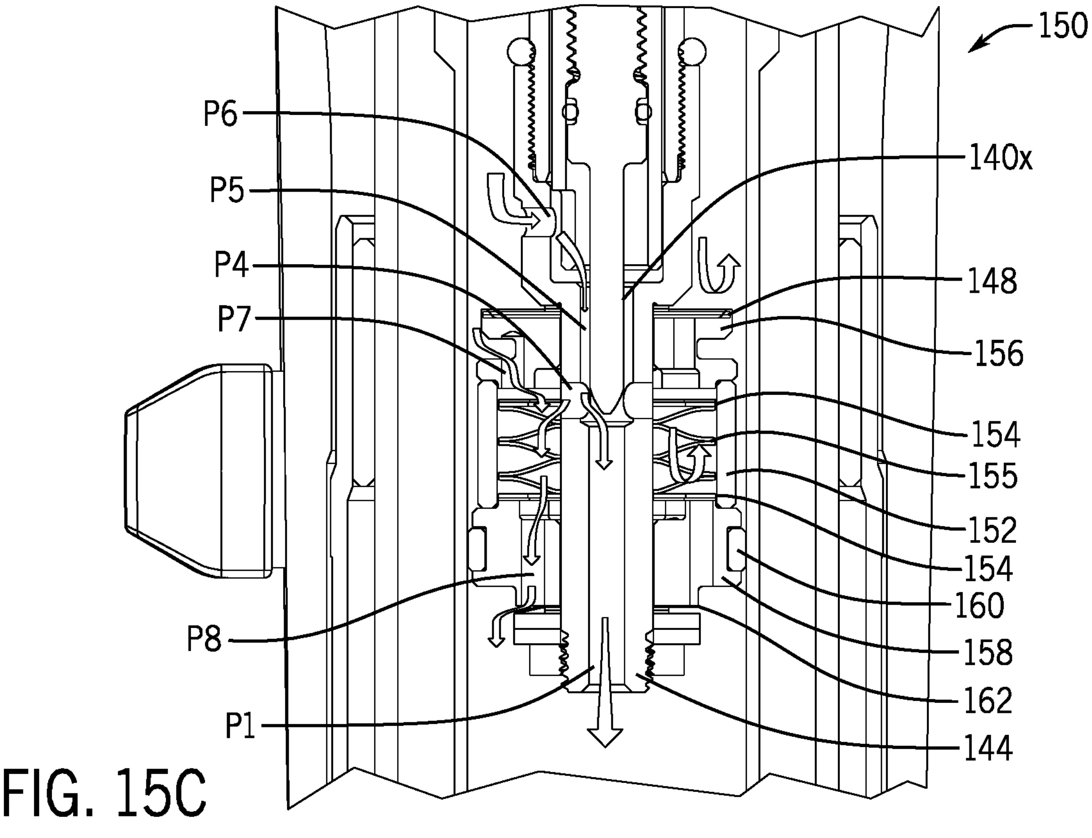
Figures 16A, 16B:
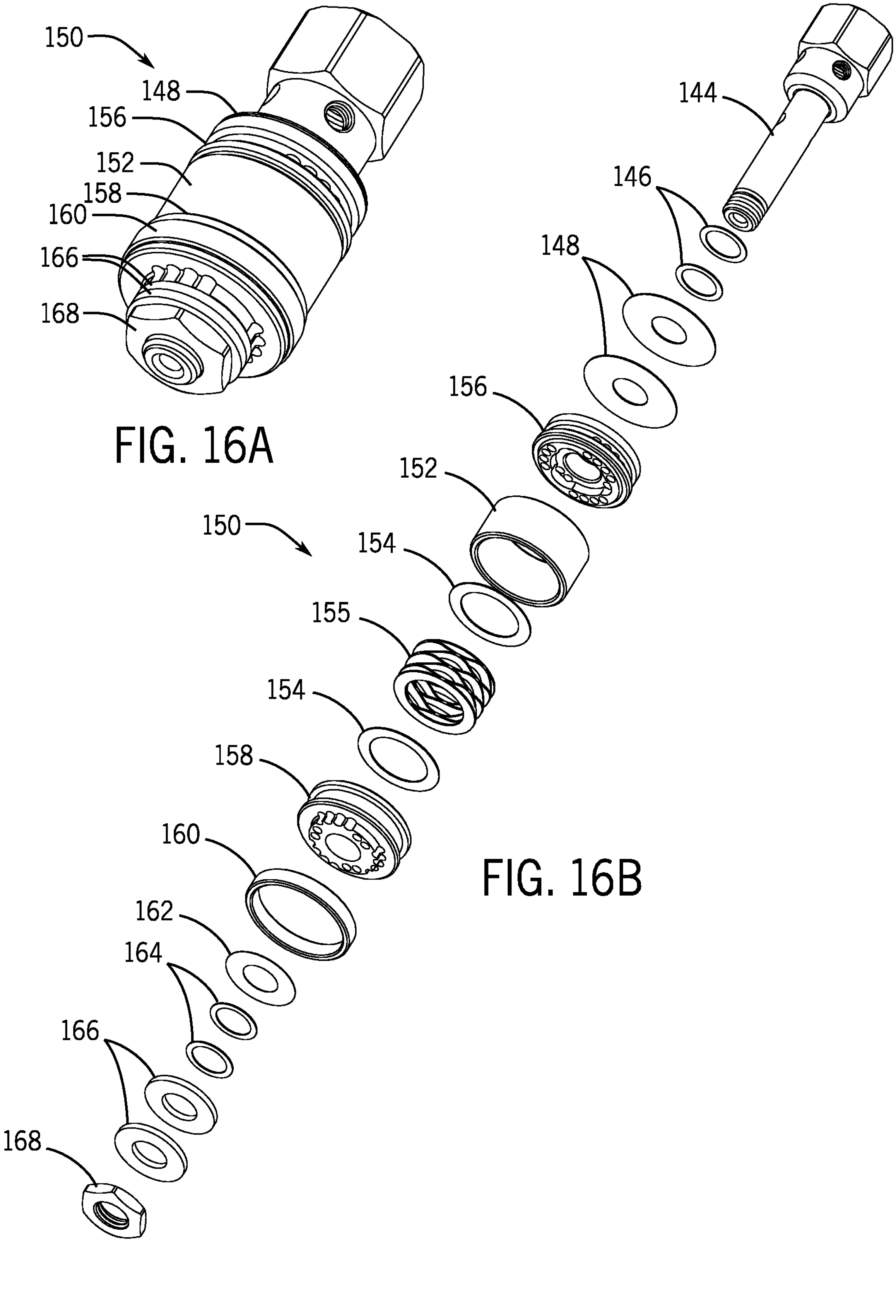
FIG. 16A is a schematic perspective view showing a piston assembly of a suspension fork assembly according to an exemplary embodiment.
FIG. 16B is a schematic exploded perspective view showing a piston assembly of a suspension fork assembly according to an exemplary embodiment.

According to an exemplary embodiment shown schematically in FIGS. 2, 3A-3B, 4, 5, 6, 7, 8, 9, 10, 11, 12, 14, 15A-15C and 16A-16B, the suspension fork assembly F/100 may comprise an inverted fork with the leg for the spring assembly inserted within the spring assembly tube 112*a* and the leg for the damper assembly 140 inserted within the damper assembly tube 112*b*; the steer tube 118 may comprise a carbon-fiber material; the steer tube 118 may have a tapered inner wall; the steer tube 118 may have a tapered inner wall and the steer tube 118 has a tapered outer wall; the steer tube 118 may be attached to the fork by an adhesive bond AD. As shown schematically in FIGS. 13 and 13A, the spring assembly tube 112*a* may comprise an aerodynamic profile configured to provide less aerodynamic drag than a circular profile.

According to an exemplary embodiment shown schematically in FIGS. 2, 3A-3B, 4, 5, 6, 7, 8, 9, 10, 11, 12, 14 and 16A-16B, the leg 102 for the spring assembly may comprise a tube; the leg 104 for the damper assembly 140 may comprise a tube; the cap insert 116 may comprise a metal material; the cap insert 116 may comprise an aluminum material; the cap insert 116 may be bonded to the fork; the cap insert 116 for the spring assembly tube 112*a* may be attached to the fork by an adhesive bond AD; the cap insert 116 for the damper assembly tube 112*b* may be attached to the fork by an adhesive bond AD; the adhesive bond AD may comprise an adhesive that is cured to form the adhesive bond AD; the cap insert 116 for the spring assembly tube 112*a* may be attached to the fork by an adhesive bond AD; the cap insert 116 for the damper assembly 140 tube may be attached to the fork by an adhesive bond AD; the steer tube 118 may comprise a steerer; the insert assembly 122 may comprise a bushing; the insert assembly 122 may comprise a seal; the seal may comprise a dust seal; the insert assembly 122 may comprise a bushing and a dust seal 128; the insert assembly 122 may comprise an upper bushing 124, a lower bushing 125, a foam ring 126, and a dust seal 128. See FIGS. 10, 11 and 12.

According to an exemplary embodiment shown schematically in FIGS. 2, 3A-3B, 4, 14, 15A-15C and 16A-16B, a suspension fork assembly F/100 may comprise a damper assembly 140 within the damper assembly tube 112*b* comprising a piston assembly 150; the piston assembly 150 may be retained within damper assembly tube 112*b* by friction; the piston assembly 150 may comprise a first piston and a second piston; the piston assembly 150 may comprise a piston spacer 152 and a glide ring 160. One piston may provide a glide ring 160; the glide ring 160 may be configured to provide a seal for a fluid path through both pistons; the first piston may be a compression piston 156; the second piston may be a rebound piston 158.

As shown schematically in FIGS. 4, 14, 15A-15C and 16A-16B, the damper assembly 140 with piston assembly 150 may comprise passages for fluid flow shown as passages P1/P2/P3/P4/P5/P6/P7/P8; a flow control arrangement for the damper assembly 140 may comprise flow control elements such as a needle 140*x* and/or at least one shim; elements may comprise a shim assembly/set; elements/shims may comprise shim 146 and/or shim 148 and/or shim 154 and/or shim 162 and/or shim 164 and/or shim 166. See TABLE A.

Figure 21A:
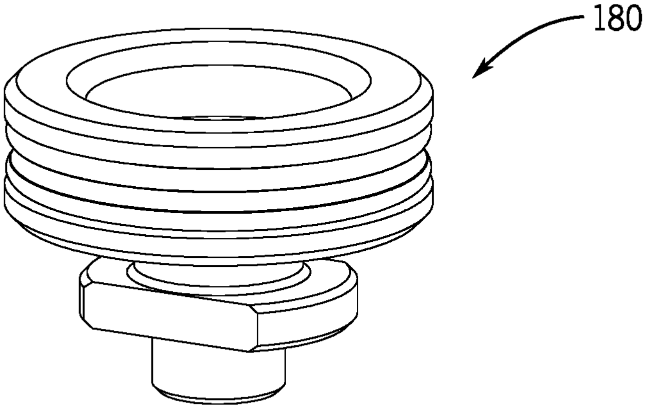
FIG. 21A is a schematic partial perspective view of a piston assembly for a suspension fork assembly according to an exemplary embodiment.
Figure 21B:
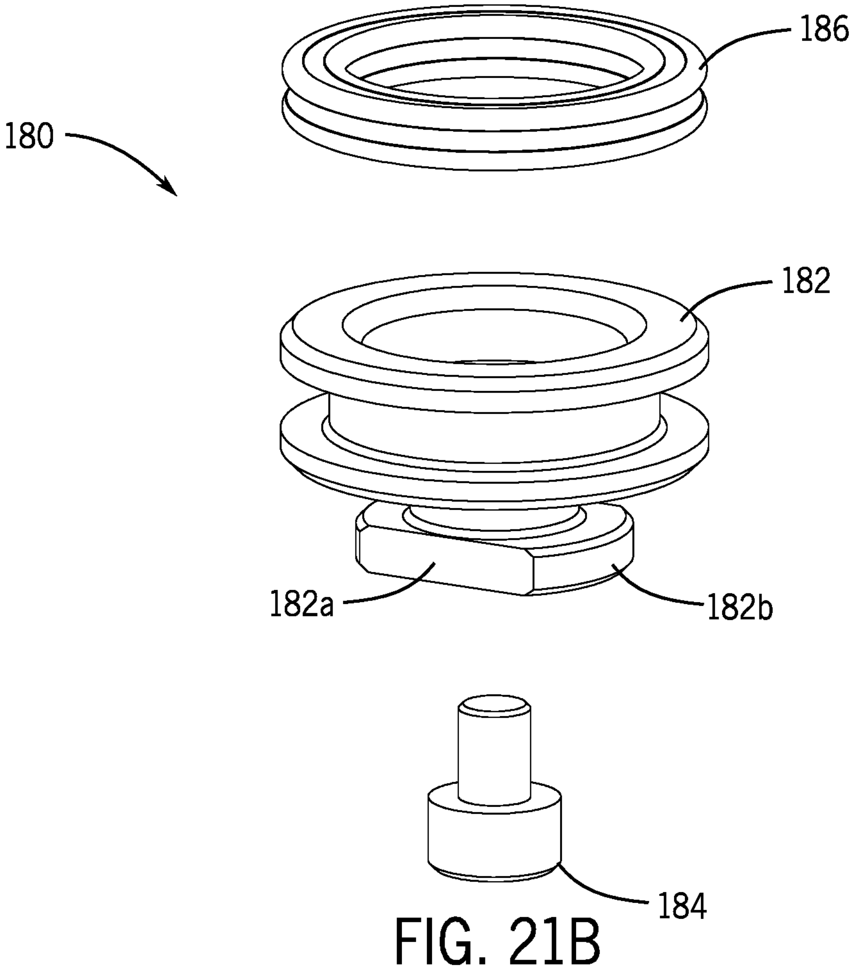
FIG. 21B is a schematic exploded partial perspective view of a piston assembly for a suspension fork assembly according to an exemplary embodiment.
Figure 22A:
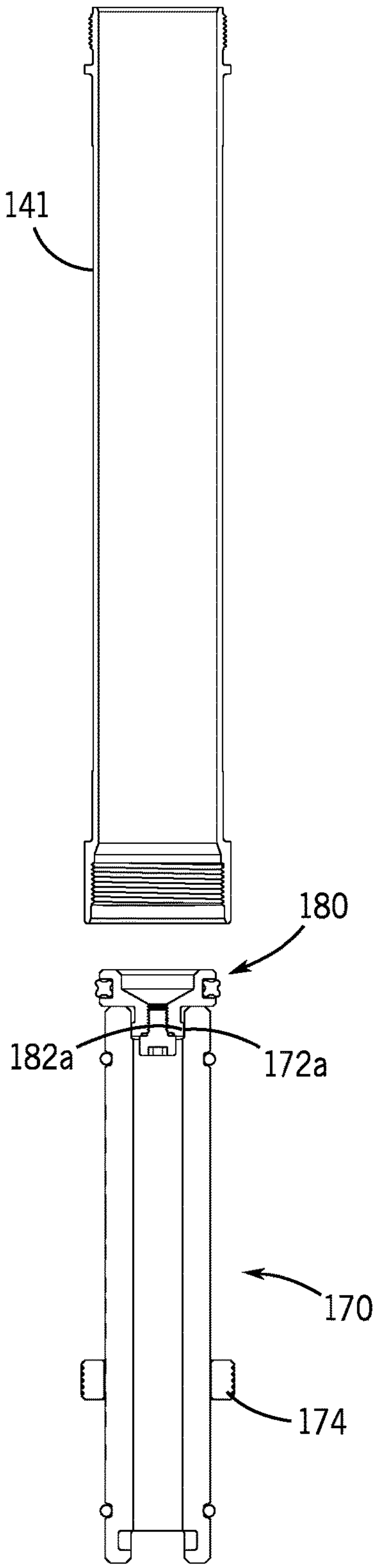
FIGS. 22A through 22C are schematic side cross-section views of use of a tool for a suspension fork assembly according to an exemplary embodiment.
Figure 22B:
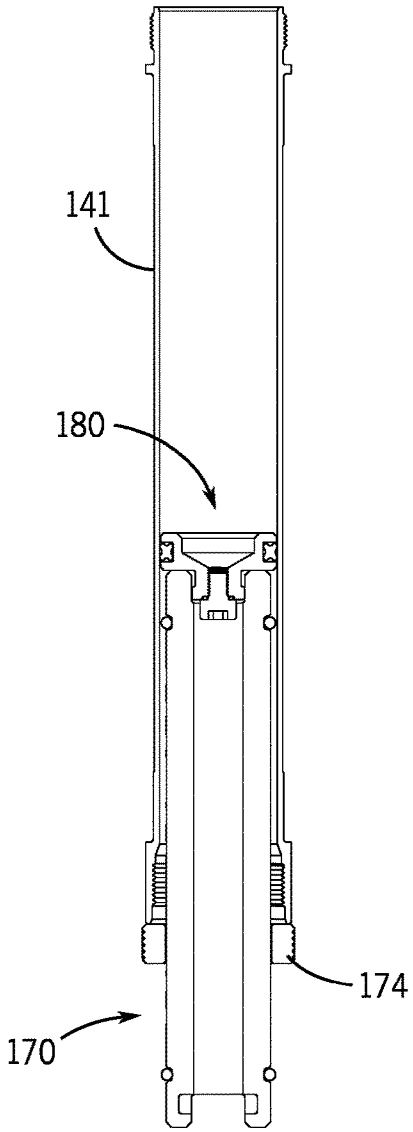
Figure 22C:
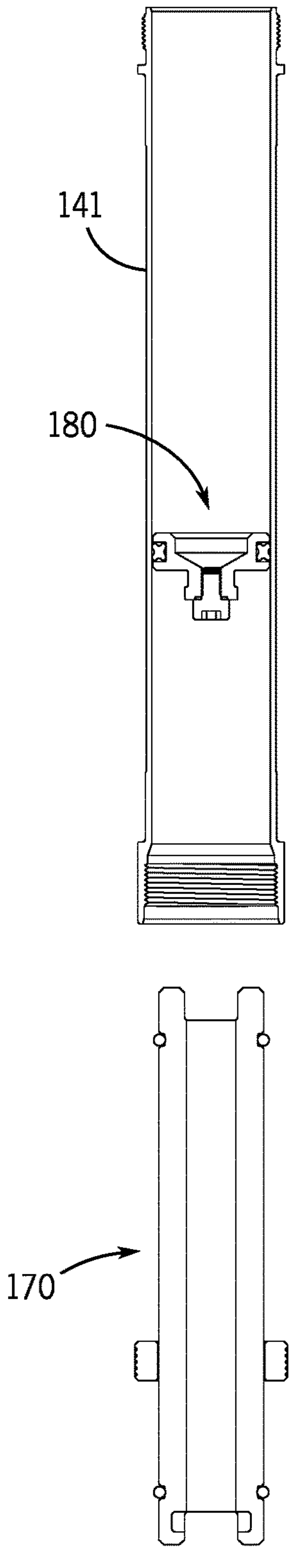
Figure 23A:
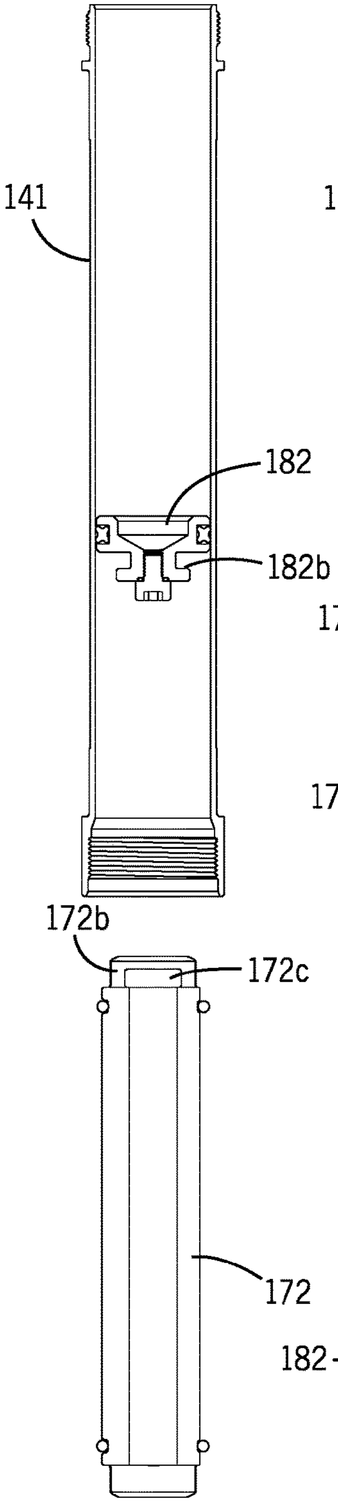
FIGS. 23A through 23D are schematic side cross-section views of use of a tool for a suspension fork assembly according to an exemplary embodiment.
Figure 23B:
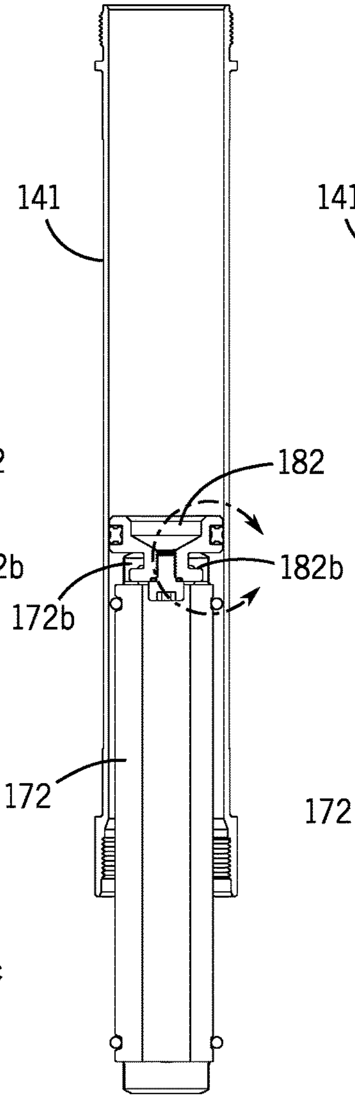
Figure 23C:
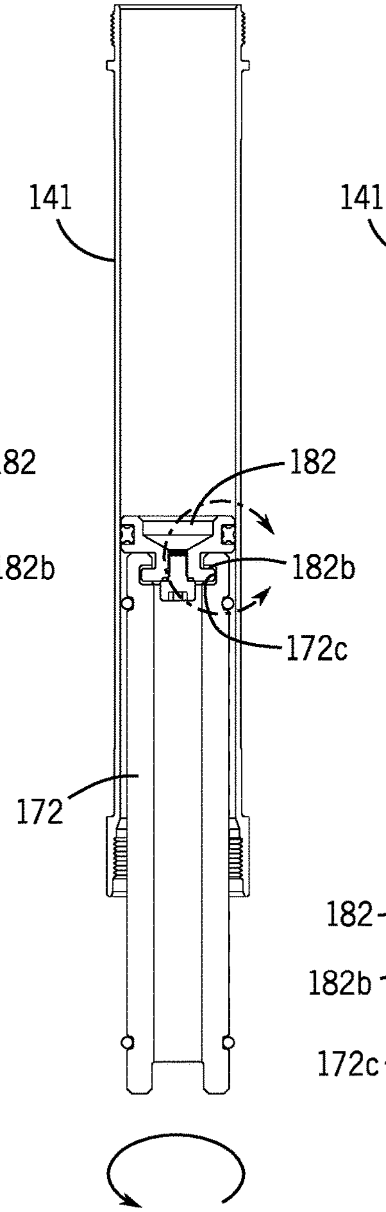
Figure 23D:
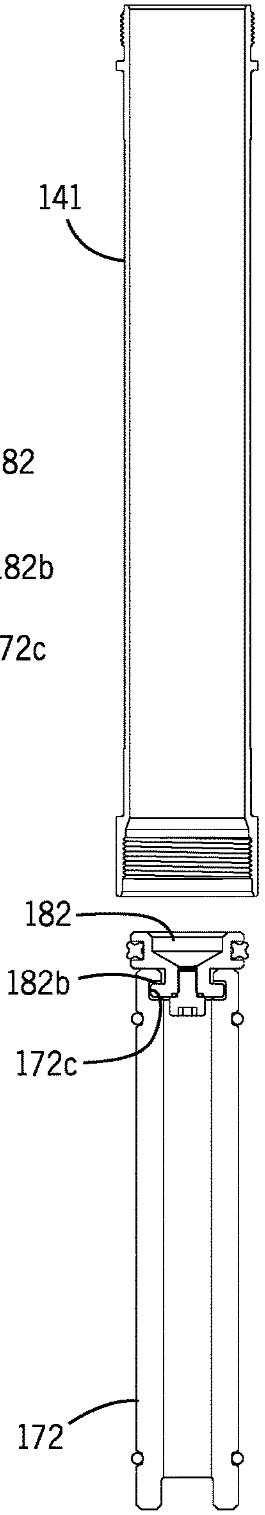
Figure 24A:
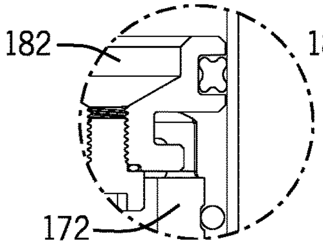
FIGS. 24A and 24B are schematic partial side cross-section views of use of a tool for a suspension fork assembly according to an exemplary embodiment.
Figure 24B:
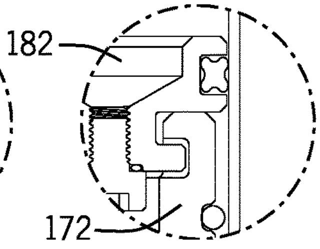
Figure 25A:
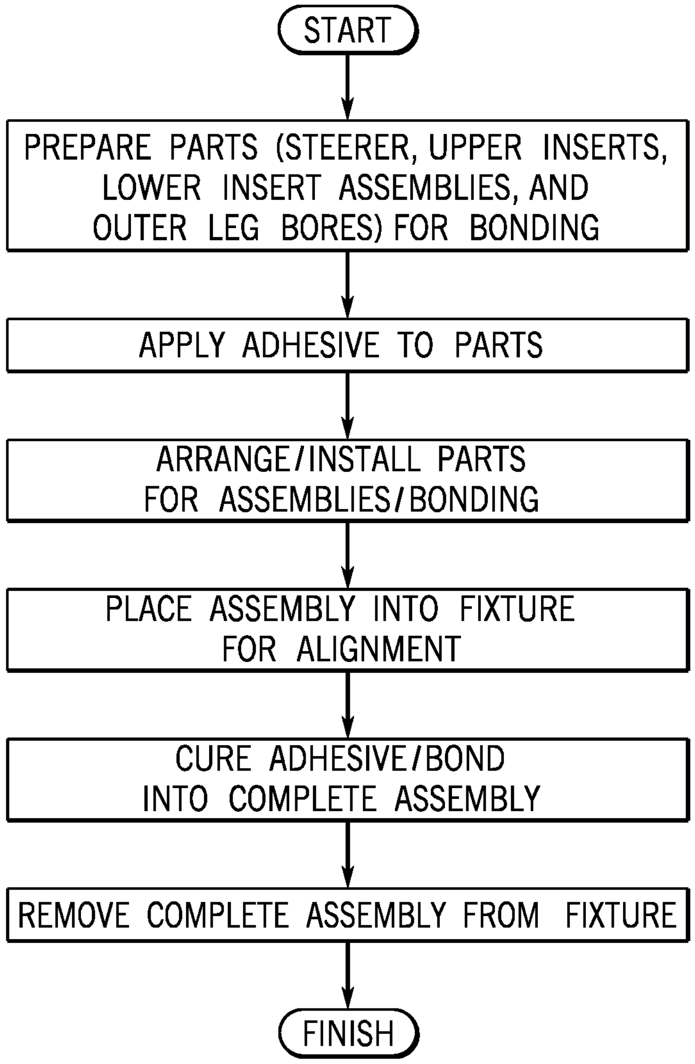
FIGS. 25A and 25B are schematic flow diagrams of a method of producing a suspension fork assembly according to an exemplary embodiment.
Figure 25B:
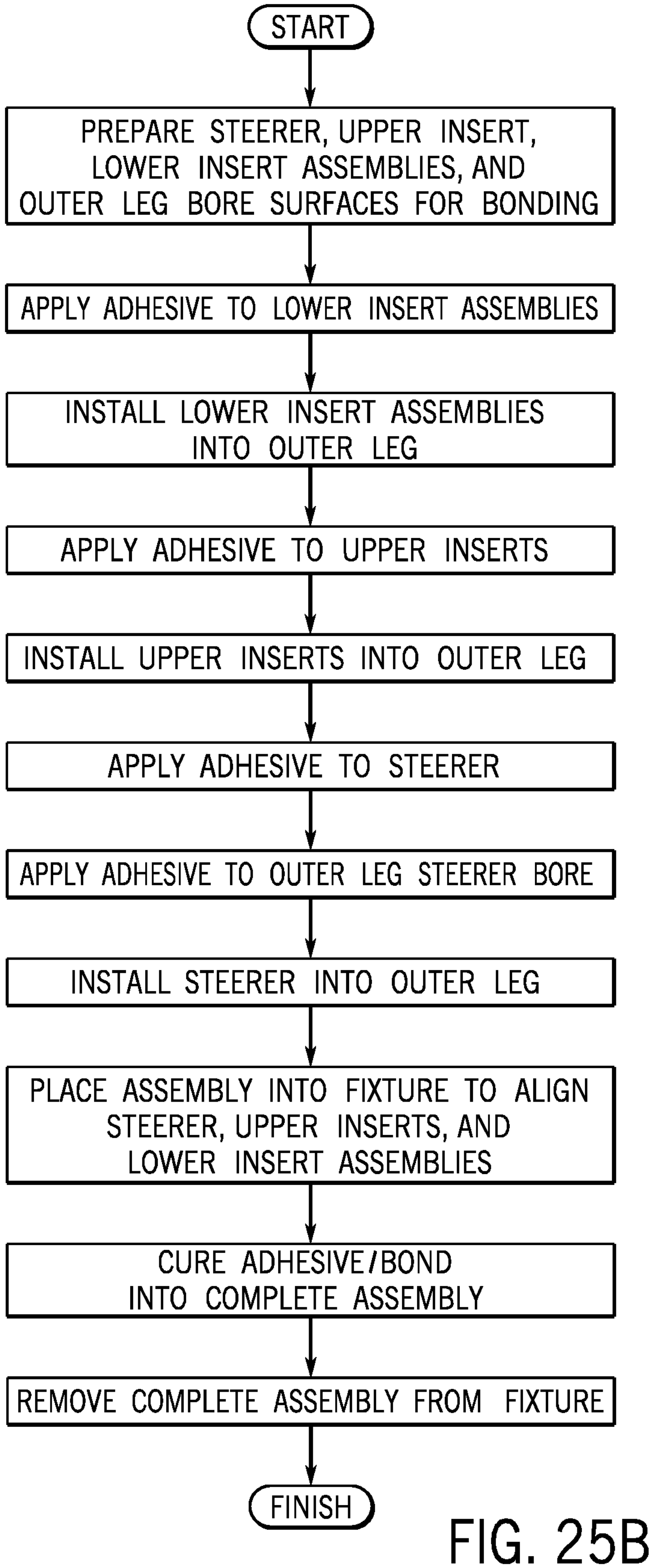
Figure 26A:
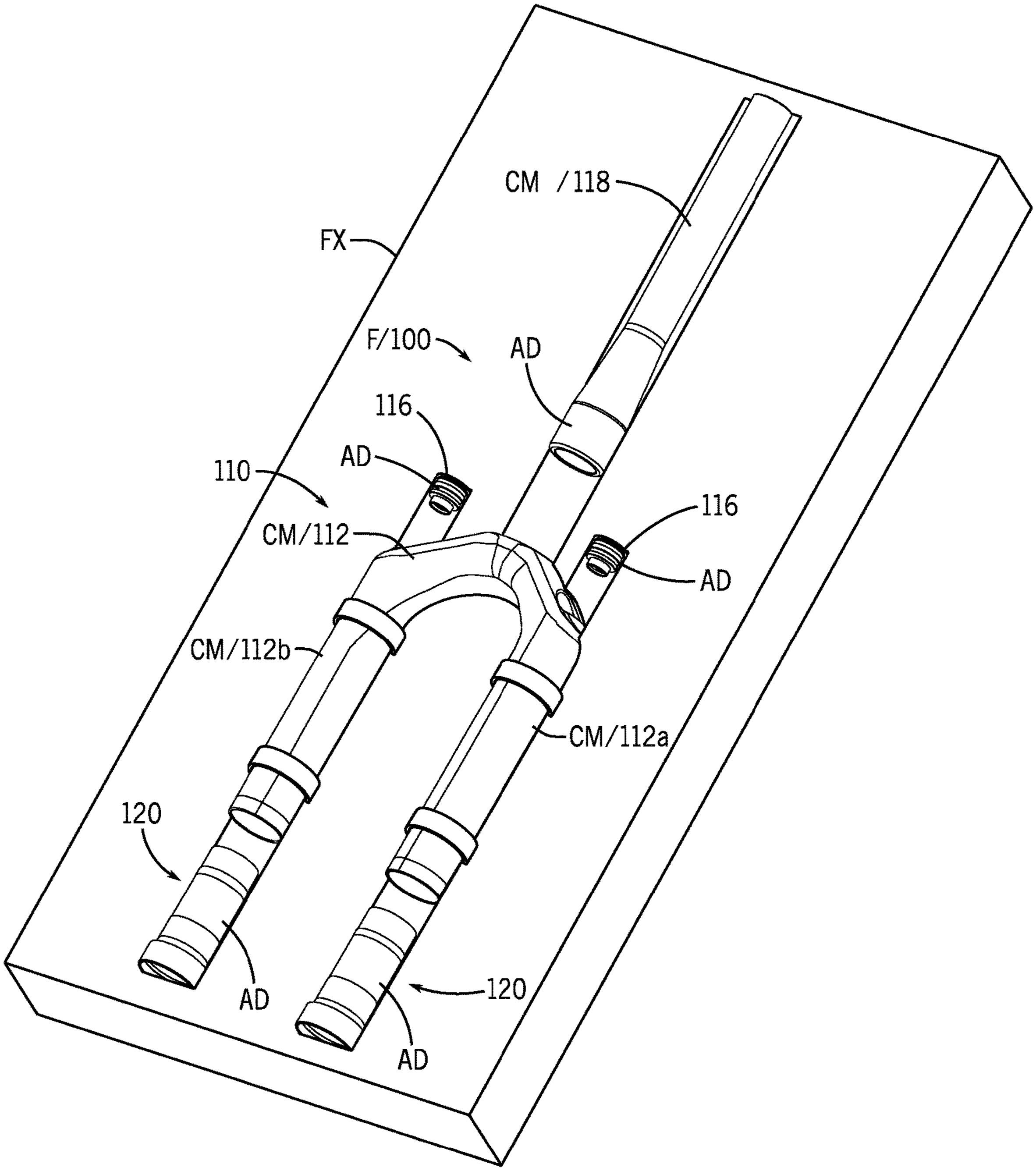
FIG. 26A is a schematic representation of a fixture with the suspension fork assembly according to an exemplary embodiment.
Figure 26B:
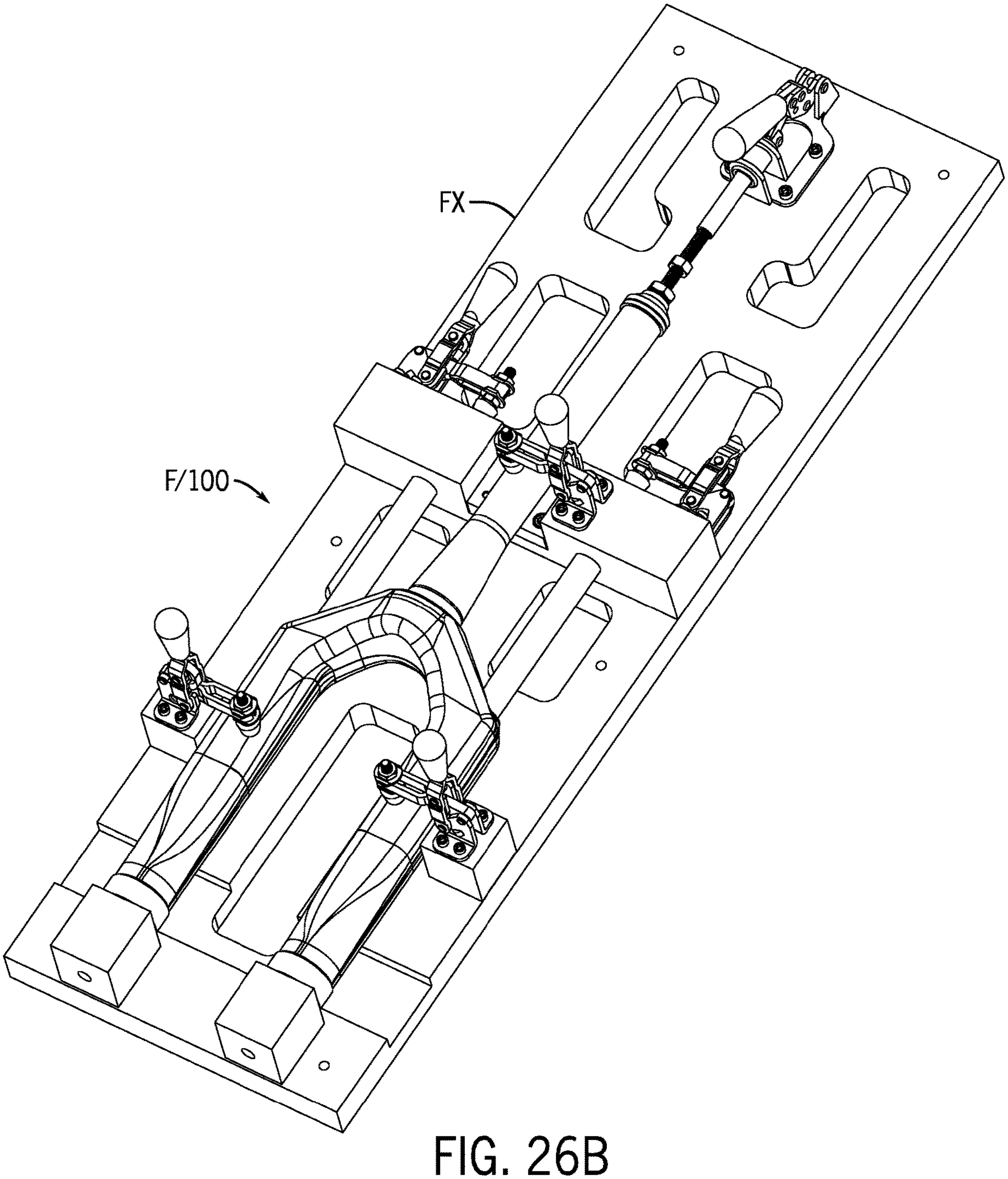
FIG. 26B is a schematic perspective view of a fixture with the suspension fork assembly according to an exemplary embodiment.

According to an exemplary embodiment shown schematically in FIGS. 2, 3A-3B, 4, 14, 15A-15C and 16A-16B, a suspension fork assembly F/100 may comprise a leg 104 and a damper assembly 140 within the leg 104 comprising a cartridge 141; the cartridge 141 may be attached within the leg 104 for the damper assembly 140 at one end and unattached at the other end; the cartridge 141 may be suspended within the leg 104 for the damper assembly 140; the cartridge 141 may be suspended at a top end within the leg 104 for the damper assembly 140; the suspension fork assembly F/100 may comprise a spring assembly; the spring assembly may comprise a spring such as an air spring; the damper assembly 140 may comprise a piston assembly 150; the piston assembly 150 may comprise a glide ring 160; the glide ring 160 may be configured to provide a seal for a fluid path through the piston assembly 150; the piston assembly 150 may comprise a first piston and a second piston; the first piston may be a compression piston 156; the second piston may be a rebound piston 158; the piston spacer 152 may contain fluid. One piston may provide a glide ring 160; the glide ring 160 may be configured to provide a seal for a fluid path through the first piston and the second piston; the cartridge 141 may comprise a cartridge tube configured for a piston assembly 150. As indicated schematically according to an exemplary embodiment in FIGS. 4 and 21A-21B, the damper assembly may comprise a cartridge 141 with a cartridge tube configured for a piston assembly comprising an internal floating piston assembly 180; the damper assembly may comprise the floating piston assembly 180; the floating piston assembly may comprise a piston 182 and a seal 186 to be secured by a screw 184. See also FIGS. 22A-22C and 23A-23D.

According to an exemplary embodiment shown schematically in FIGS. 2, 3A-3B, 4, 14, 15A-15C and 16A-16B, the suspension fork assembly may comprise an inverted fork with the leg 102 for the spring assembly inserted within the spring assembly tube 112*a*/CF and the leg 104 for the damper assembly inserted within the damper assembly tube 112*b*/CF. A cartridge 141 may be suspended within the leg 104 for the damper assembly 140; the damper assembly 140 may comprise a piston assembly 150; the piston assembly 150 may comprise a seal and a glide ring 160; the glide ring 160 may be configured to provide a seal for a fluid path through the piston assembly 150. The piston assembly 150 may comprise a first/compression piston and a second/rebound piston. The piston spacer 152 may contain fluid; one piston may provide the glide ring 160 to provide a seal for a fluid path through the first piston and the second piston.

According to an exemplary embodiment shown schematically in FIGS. 2, 3A-3B, 4, 14, 15A-15C and 16A-16B, a piston assembly 150 for a damper assembly 140 of a suspension fork assembly F/100 may comprise a first piston and a second piston and a piston spacer 152 and a glide ring 160. One piston may provide a glide ring 160; the glide ring 160 may be configured to provide a seal for a fluid path through both pistons; the first piston may be a compression piston; the second piston may be a rebound piston; the piston spacer 152 may contain the fluid path.

The suspension fork assembly may comprise components formed of a composite material such as a carbon, glass, or organic fiber in a polymer matrix.

Method of Assembly

According to an exemplary embodiment shown schematically in FIGS. 5, 25A-25B and 26, a method of producing a suspension fork assembly F/100 comprising a fork of a composite material CM such a carbon fiber may comprise the steps of preparing components for assembly and assembly of the components including bonding/attachment using an adhesive such as adhesive AD. See also FIGS. 1, 2, 3A-3B, 4, 6, 7, 8 and 9. FIG. 26A is a schematic representation of a fixture FX with the suspension fork assembly F/100 according to an exemplary embodiment; FIG. 26B is a schematic diagram of a fixture FX with the suspension fork assembly F/100 according to an exemplary embodiment.

According to an exemplary embodiment shown schematically in FIGS. 5, 25A-25B and 26B, a method of assembling a suspension fork assembly F/100 comprising a fork of a composite material comprising a steer tube 118/CM and a tube 112/CM comprising a spring assembly tube 112*a*/CM with a cap insert 116 and a damper assembly tube 112*b*/CM with a cap insert 116 with a leg 102 for a spring assembly 130 configured to be fit within the spring assembly tube 112*a* of the fork and a leg 104 for a damper assembly 140 configured to be fit within the damper assembly tube 112*b* of the fork may comprise the steps of preparing an insert assembly 120 and each cap insert 116 for bonding and applying adhesive to each cap insert 116 for an adhesive bond AD and installing each cap insert 116 to the fork and curing each adhesive bond AD for each cap insert 116. See also FIGS. 2, 3A-3B, 4, 6, 7, 8, 9, 10, 11, 12, 14 and 16A-16B.

According to an exemplary embodiment shown schematically in FIGS. 26 and 27, the method may comprise the steps of placing the fork in a fixture and removing the fork from the fixture; the method may comprise the steps of placing the fork in a fixture after installing each cap insert 116 to the fork and removing the fork from the fixture after curing each adhesive bond AD for each cap insert 116; the step of installing each cap insert 116 for the fork may comprise installing the cap insert 116 for the spring assembly tube 112*a*/CM into the spring assembly tube 112*a*/CM with the adhesive bond AD; the step of installing each cap insert 116 for the fork may comprise installing the cap insert 116 for the damper assembly tube 112*b*/CM into the damper assembly tube 112*b*/CM with the adhesive bond AD; the step of installing each cap insert 116 for the fork may comprise installing the cap insert 116 for the spring assembly tube 112*a*/CM into the spring assembly tube 112*a*/CM with the adhesive bond AD and installing the cap insert 116 for the damper assembly tube 112*b*/CM into the damper assembly tube 112*b*/CM with the adhesive bond AD; the method may comprise the step of providing the leg 102 for the spring assembly 130 inserted within the suspension assembly tube; the method may comprise the step of providing the leg 104 for the damper assembly 140 inserted within the damper assembly tube 112*b*/CM; the method may comprise the step of preparing the steer tube 118 for bonding to the fork and applying adhesive to the steer tube 118 for an adhesive bond AD; the method may comprise the step of attaching the steer tube 118 to the fork with the adhesive bond AD; the method may comprise the step of curing the adhesive bond AD for the steer tube 118; the method may comprise the step of placing the fork in a fixture after attaching the steer tube 118; the method may comprise the step removing the fork from the fixture after curing the adhesive bond AD for the steer tube 118; the steer tube 118 may comprise a carbon-fiber material; the steer tube 118 may comprise a steerer; the fork may comprise an insert assembly 120. See also FIGS. 2, 3A-3B, 4, 5, 6, 7, 8, 9, 10, 11, 12, 14 and 16A-16B.

According to an exemplary embodiment shown schematically in FIGS. 5, 10 and 25A-25B, the method may comprise the step of preparing the insert assembly 120 for bonding to the fork and applying adhesive to the insert assembly 120 for an adhesive bond AD; the method may comprise the step of attaching the insert assembly 120 to the fork with the adhesive bond AD; the method may comprise the step of curing the adhesive bond AD for the insert assembly 120. See also FIGS. 2, 3A-3B, 4, 5, 6, 7, 8, 9, 11, 12, 14 and 16A-16B.

According to an exemplary embodiment shown schematically in FIGS. 5, 10, 25A-25B and 26B, the method may comprise the step of placing the fork in a fixture after attaching the insert assembly 120; the method may comprise the step removing the fork from the fixture after curing the adhesive bond AD for the insert assembly 120; the step of installing each insert assembly 120 for the fork may comprise installing the insert assembly 120 for the spring assembly tube 112*a*/CM into the spring assembly tube 112*a*/CM with the adhesive bond AD; the step of installing each insert assembly 120 for the fork may comprise installing the insert assembly 120 for the damper assembly tube 112*b*/CM into the damper assembly tube 112*b*/CM with the adhesive bond AD; the step of installing each insert assembly 120 for the fork may comprise installing the insert assembly 120 for the spring assembly tube 112*a*/CM into the spring assembly tube 112*a*/CM with the adhesive bond AD and installing the insert assembly 120 for the damper assembly tube 112*b*/CM into the damper assembly tube 112*b*/CM with the adhesive bond AD. See also FIGS. 2, 3A-3B, 4, 5, 6, 7, 8, 9, 11, 12, 14 and 16A-16B.

According to an exemplary embodiment indicated schematically in FIGS. 5, 10, 25A-25B and 26B, a fixture may be configured to align the steer tube 118/CM and the cap insert 116 in the spring tube 112*a*/CM; the fixture may be configured to align the steer tube 118/CM and the insert assembly 120 in the spring tube 112*a*/CM; the fixture may be configured to align the cap insert 116 in the spring tube 112*a*/CM and the insert assembly 120 in the spring tube 112*a*/CM; the fixture may be configured to align the cap insert 116 in the spring tube 112*a*/CM and the cap insert 116 in the damper tube 112*b*/CM; the fixture may be configured to align the insert assembly 120 in the spring tube 112*a*/CM and the insert assembly 120 in the damper tube 112*b*/CM; the fixture may be configured to align the cap insert 116 in the spring tube 112*a*/CM, the cap insert 116 in the damper tube 112*b*/CM, the insert assembly 120 in the spring tube 112*a*/CM, and insert assembly 120 in the damper tube 112*b*/CM; the fixture may be configured to align the steer tube 118/CM, the cap insert 116 in the spring tube 112*a*/CM, the cap insert 116 in the damper tube 112*b*/CM, the insert assembly 120 in the spring tube 112*a*/CM, and insert assembly 120 in the damper tube 112*b*/CM; the insert assembly 120 may comprise a bushing; the insert assembly 120 may comprise a seal; the seal may comprise a dust seal; the insert assembly 120 may comprise a bushing and a dust seal; the insert assembly 120 may comprise an upper bushing 124, a lower bushing 126, a foam ring 160, and a dust seal 128. See also FIGS. 2, 3A-3B, 4, 6, 7, 8, 9, 11, 12, 14 and 16A-16B.

Aerodynamic Profile

According to an exemplary embodiment shown schematically in FIGS. 1, 2, 3A-3B, 5, 13 and 13A, a suspension fork assembly F/100 may comprise a spring assembly tube 112*a* and a damper assembly tube 112*b* (i.e. each tube provided as a component formed of an engineered/composite material CM such as carbon fiber); the spring assembly tube 112*a* may comprise a profile; the damper assembly tube 112*n* may comprise a profile; the profile may comprise an aerodynamic profile configured to provide less aerodynamic drag than a circular profile; the damper assembly tube 112*b* of the fork may comprise a profile; the profile may comprise an aerodynamic profile configured to provide less aerodynamic drag than a circular profile; the aerodynamic profile may comprise a generally D-shaped profile; the aerodynamic profile may comprise a Kamm tail; the aerodynamic profile may provide a drag force of less than 75 percent of drag force of a circular profile tube at 30 miles per hour (mph); the aerodynamic profile may provide a drag force of less than 1 Newton (N) at 30 mph.

Tool for Installing/Removing Piston Assembly

According to an exemplary embodiment shown schematically in FIGS. 17, 18, 19A-19B, 20, 21A-21B, 22A-22C, 23A-23D and 24A-24B, a tool/tool assembly 170 may be configured for engagement of a piston assembly 180 of a damper assembly with cartridge 141 for a leg of a suspension fork assembly F/100; as indicated schematically, the tool 170 can be configured to fit within the damper assembly tube to facilitate installation/positioning of the piston assembly 180 within the damper assembly/cartridge 141 (see FIGS. 22A-22C) and to facilitate removal of the piston assembly 180 from the damper assembly/cartridge 141 (sec FIGS. 23A-23D). The piston assembly 180 may be retained within the leg for the damper assembly 140 by friction/interference (e.g. fit for installation, placement, positioning and removal).

As indicated schematically in FIGS. 22A-22B, 23A-23D and 24A-24B, the piston assembly of the damper assembly may comprise an internal floating piston assembly 180 providing a piston 182 with flats 182*a* and protrusions 182*b* and seal 186 and screw 184; the flats 182*a* and protrusions 182*b* may be configured to engage tool 170; tool 170 may comprise a body/base and a first end with flats 172*b* and pockets 172*c* configured to retain/disengage the flats 182*a* and protrusions 182*b* of the piston assembly 180 by rotation (e.g. for removal) and a second end with flats 172*a* configured to engage the flats 182*a* of the piston assembly 180 (e.g. for installation).

Figure 17:
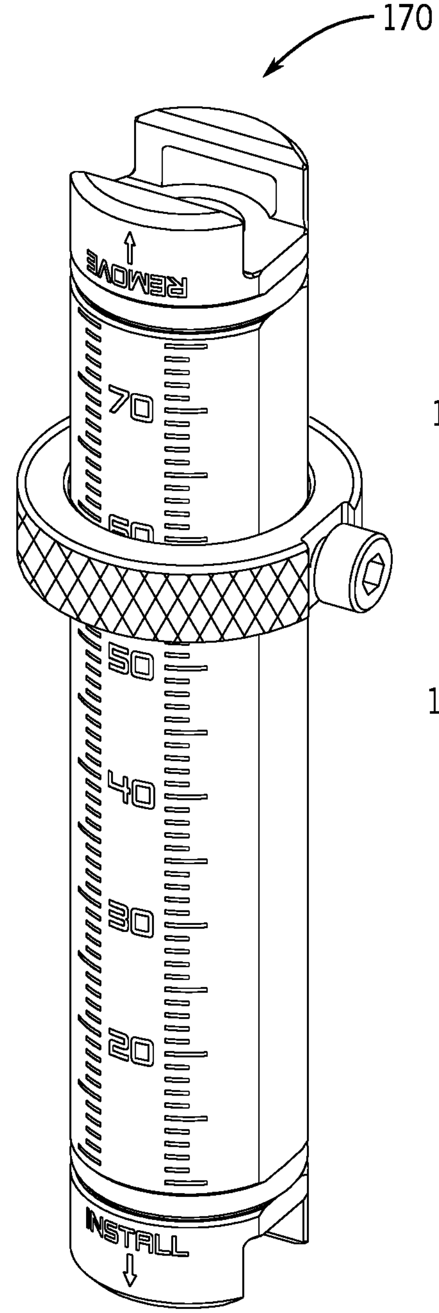
FIG. 17 is a schematic perspective view of a tool for a suspension fork assembly according to an exemplary embodiment.
Figure 19A:
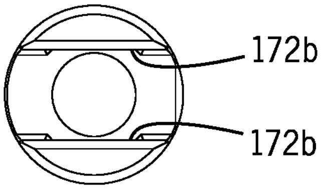
FIGS. 19A and 19B are schematic top cross-section views of a tool for a suspension fork assembly according to an exemplary embodiment.
Figure 18:
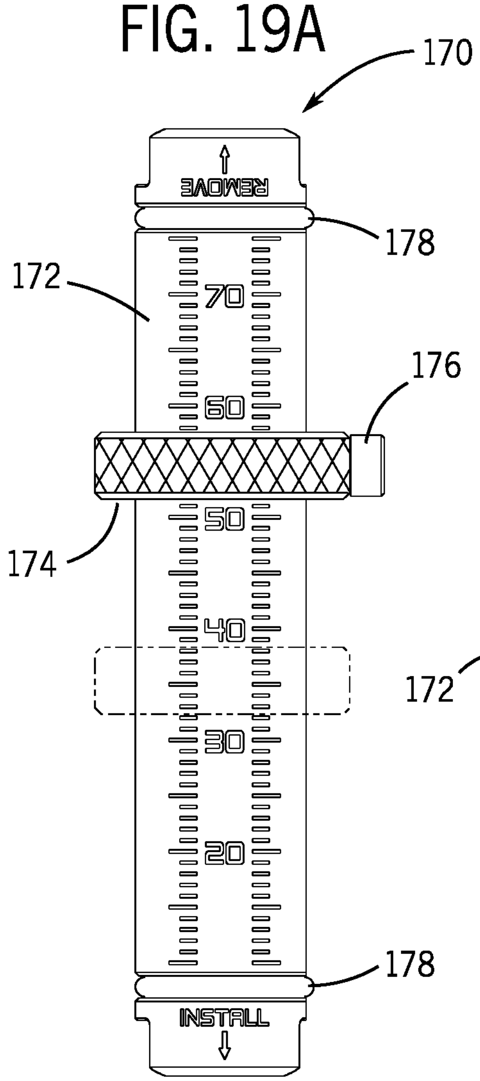
FIG. 18 is a schematic side elevation view of a tool for a suspension fork assembly according to an exemplary embodiment.
Figure 20:
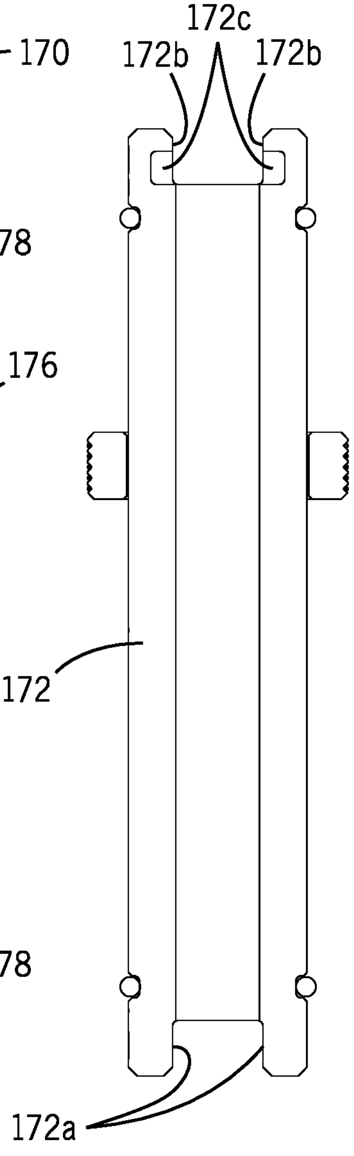
FIG. 20 is a schematic side elevation cross-section view of a tool for a suspension fork assembly according to an exemplary embodiment.
Figure 19B:
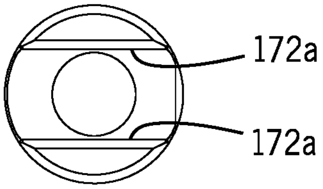

As indicated schematically in FIGS. 17 and 18, the tool 170 may comprise an O-ring 178 and a collar 174 configured to fit on the body retained by a screw 176 to the body; the body may comprise indicia configured to indicate position of the collar 174 on the body. See also FIG. 22B. The collar 174 may be configured to be secured along the body to determine and/or set a position of installation of the piston assembly within the leg; the indicia may be used to indicate position of installation of the piston assembly within the leg; the indicia may indicate instructions for use of the tool (e.g. indicia at ends of tool to indicate "INSTALL" end/use or "REMOVE" end/use).

According to an exemplary embodiment shown schematically in FIGS. 17, 18, 19A-19B, 20, 21A-21B, 22A-22C, 23A-23D and 24A-24B, the tool may comprise a body comprising the base and the first end and the second end; the first end may comprise a projection and a recess; the first end may be configured to retain the piston assembly for installation within the leg; the second end may comprise a projection and a recess; the second end may comprise a feature configured to engage the piston assembly for removal from the leg; the second end may comprise a feature configured to attach to the piston assembly for removal from the leg; the second end of the tool may be configured to attach to the piston by rotation; the collar may be secured to the body by a fastener; the indicia may comprise a scale; the indicia may be used to identify position of the collar and/or piston assembly within the leg/tube.

Exemplary Embodiments—B

According to an exemplary embodiment shown schematically in FIGS. 5, 25A-25B and 26A-26B, a method of assembling a suspension fork assembly comprising components comprising a fork comprising a steer tube and a spring assembly tube with an insert assembly and a leg for a spring assembly and a damper assembly tube with an insert assembly and a leg for a damper assembly may comprise the steps of (a) preparing each insert assembly for bonding with an adhesive bond; (b) applying adhesive to each insert assembly to provide the adhesive bond; (c) installing each insert assembly for the fork; (d) aligning at least two of the components comprising the fork in a fixture; (e) curing the adhesive bond for each insert assembly; the fork may comprise a composite material; the leg for the spring assembly may be configured to be fit within the spring assembly tube; the leg for the damper assembly may be configured to be fit within the damper assembly tube. The fixture may be configured for axial parallel alignment of the insert assembly in the spring assembly tube with the insert assembly in the damper assembly tube. The fork may comprise a cap insert; the method may further comprise the steps of preparing the cap insert for an adhesive bond in the fork and applying adhesive to the cap insert for the adhesive bond in the fork and attaching the cap insert in the fork with the adhesive bond before placing the fork in the fixture and curing the adhesive bond for the cap insert before removing the fork from the fixture. The cap insert may comprise a cap insert for the spring assembly tube and a cap insert for the damper assembly tube; further comprising the step of installing the cap insert for the spring assembly tube into the spring assembly tube with an adhesive bond and installing the cap insert for the damper assembly tube into the damper assembly tube with an adhesive bond. The fixture may be configured to axially align the cap insert with the insert assembly in the spring assembly tube. The fixture may be configured to co-axially align the cap insert with the insert assembly in the spring assembly tube and to co-axially align the cap insert with the insert assembly in the damper assembly tube and to axially align the cap insert and the insert assembly in the spring assembly tube with the cap insert and the insert assembly in the damper assembly tube. The fixture may be configured to axially align the steer tube with the insert assembly in the spring assembly tube and to axially align the steer tube with the insert assembly in the damper assembly tube. The steps of preparing the steer tube for bonding to the fork and applying adhesive to the steer tube for an adhesive bond and attaching the steer tube to the fork with the adhesive bond before placing the fork in the fixture and curing the adhesive bond for the steer tube before removing the fork from the fixture. The fixture may be configured to axially align the steer tube with the insert assembly in the spring assembly tube and to axially align the steer tube with the insert assembly in the damper assembly tube. The fork and the steer tube comprise a carbon fiber material.

According to an exemplary embodiment shown schematically in FIGS. 2, 3A-3B, 4, 5, 6, 7, 8 and 9, a suspension fork assembly may (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork; the fork may comprise a composite material; the fork may be configured to be assembled with alignment of the spring assembly tube and/or the damper assembly tube. The suspension fork assembly may comprise an adhesive bond for the steer tube of the fork and/or an adhesive bond for the cap insert for the spring assembly tube of the fork and/or an adhesive bond for the cap insert for the damper assembly tube of the fork and/or an adhesive bond for the insert assembly for the spring assembly tube of the fork and/or an adhesive bond for the insert assembly for the damper assembly tube of the fork. The insert assembly in the spring assembly tube may be axially aligned with the insert assembly in the damper assembly tube. The cap insert in the damper assembly tube may be co-axially aligned with the insert assembly in the damper assembly tube. The cap insert in the spring assembly tube may be co-axially aligned with the insert assembly in the spring assembly tube and the cap insert in the damper assembly tube may be co-axially aligned with the insert assembly in the damper assembly tube and the insert assembly in the spring assembly tube may be axially aligned in parallel with the insert assembly in the damper assembly tube. The steer tube may be axially aligned in parallel with the cap insert in the spring assembly tube and the steer tube may be axially aligned in parallel with the cap insert in the damper assembly tube. The steer tube may be axially aligned in parallel with the insert assembly in the spring assembly tube and the steer tube may be axially aligned in parallel with the insert assembly in the damper assembly tube. The steer tube may be axially aligned in parallel with the cap insert in the spring assembly tube and the steer tube may be axially aligned in parallel with the cap insert in the damper assembly tube. The insert assembly may comprise a bushing and a seal. The steer tube may comprise a composite material.

The present invention relates to a method of assembling a suspension fork assembly comprising components comprising a steer tube and a spring assembly tube with a cap insert and a damper assembly tube with a cap insert with a leg for a spring assembly configured to be fit within the spring assembly tube of the fork and a leg for a damper assembly configured to be fit within the damper assembly tube of the fork; the method may comprise the steps of: (a) preparing each cap insert for bonding; (b) applying adhesive to each cap insert for an adhesive bond; (c) installing each cap insert to the fork; (d) aligning at least two of the components in a fixture; (c) curing each adhesive bond for each cap insert. The step of installing each cap insert for the fork may comprise installing the cap insert for the spring assembly tube into the spring assembly tube with the adhesive bond and installing the cap insert for the damper assembly tube into the damper assembly tube with the adhesive bond. The method may comprise the steps of preparing a steer tube for bonding to the fork and applying adhesive to the steer tube for an adhesive bond, attaching the steer tube to the fork with the adhesive bond before placing the fork in the fixture, and curing the adhesive bond for the steer tube before removing the fork from the fixture. The steer tube may comprise a composite material. The fork may comprise an insert assembly and the method further may comprise the steps of preparing the insert assembly for bonding to the fork and applying adhesive to the insert assembly for an adhesive bond, attaching the insert assembly to the fork with the adhesive bond before placing the fork in the fixture, and curing the adhesive bond for the insert assembly before removing the fork from the fixture. The method may comprise the step of attaching each insert assembly to the fork may comprise installing the insert assembly for the spring assembly tube into the spring assembly tube with the adhesive bond and installing the insert assembly for the damper assembly tube into the damper assembly tube with the adhesive bond. The fixture may be configured to align the steer tube, the insert assembly in the spring tube, and the insert assembly in the damper tube. The fixture may be configured to align the cap insert in the spring tube and the insert assembly in the spring tube. The fixture may be configured to align the cap insert in the damper tube and the insert assembly in the damper tube. The fixture may be configured to align the cap insert in the spring tube and the cap insert in the damper tube. The fixture may be configured to align the insert assembly in the spring tube and the insert assembly in the damper tube. The fixture may be configured to align the cap insert in the spring tube, the cap insert in the damper tube, the insert assembly in the spring tube, and insert assembly in the damper tube. The fixture may be configured to align the steer tube, the cap insert in the spring tube, the cap insert in the damper tube, the insert assembly in the spring tube, and insert assembly in the damper tube. The insert assembly may comprise a bushing and a seal. The insert assembly may comprise an upper bushing, a lower bushing, a foam ring, and a dust seal. A suspension fork assembly may comprise an inverted fork. A suspension fork assembly may comprise a composite material; the composite material may comprise a carbon fiber material.

According to an exemplary embodiment shown schematically in FIGS. 2, 3A-3B, 4, 5, 6, 7, 8 and 9, a suspension fork assembly may comprise (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork.

According to an exemplary embodiment shown schematically in FIGS. 2, 3A-3B, 4, 5, 6, 7, 8 and 9, a suspension fork assembly may comprise (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork; the cap insert for the spring assembly tube may be aligned with the fork and attached by an adhesive bond; the cap insert for the damper assembly tube may be aligned with the fork and attached by an adhesive bond.

According to an exemplary embodiment shown schematically in FIGS. 2, 3A-3B, 4, 5, 6, 7, 8 and 9, a suspension fork assembly may comprise (a) a fork comprising (1) a steer tube and (2) a spring assembly tube with a cap insert and an insert assembly for a spring assembly and (3) a damper assembly tube with a cap insert and an insert assembly for a damper assembly; (b) a leg for the spring assembly configured to be fit within the spring assembly tube of the fork; (c) a leg for the damper assembly configured to be fit within the damper assembly tube of the fork; the cap insert for the spring assembly tube may be aligned with the steer tube for the fork and attached by an adhesive bond; the cap insert for the damper assembly tube may be aligned with the steer tube for the fork and attached by an adhesive bond.

According to an exemplary embodiment shown schematically in FIGS. 2, 3A-3B, 4, 5, 6, 7, 8 and 9, a suspension fork assembly may comprise a fork comprising a steer tube and a spring assembly tube with an insert assembly and a leg for a spring assembly and a damper assembly tube with an insert assembly and a leg for a damper assembly; the leg for the spring assembly may be configured to be fit within the spring assembly tube; the leg for the damper assembly may be configured to be fit within the damper assembly tube.

According to an exemplary embodiment shown schematically in FIGS. 2, 3A-3B, 4, 5, 6, 7, 8 and 9, a suspension fork assembly may comprise a fork comprising a steer tube and a spring assembly tube with an insert assembly and a leg for a spring assembly and a damper assembly tube with an insert assembly and a leg for a damper assembly; the leg for the spring assembly may be configured to be fit in alignment within the spring assembly tube; the leg for the damper assembly may be configured to be fit in alignment within the damper assembly tube.

According to an exemplary embodiment shown schematically in FIGS. 5, 10, 25A-25B and 26B, a method of assembling a suspension fork assembly comprising a fork comprising a steer tube and a spring assembly tube with an insert assembly and a leg for a spring assembly and a damper assembly tube with an insert assembly and a leg for a damper assembly may comprise the steps of (a) preparing each insert assembly for bonding with an adhesive bond; (b) applying adhesive to each insert assembly to provide the adhesive bond; (c) installing each insert assembly for the fork; (d) aligning at least two of the components comprising the fork in a fixture; (c) curing the adhesive bond for each insert assembly; the fork may comprise a composite material; the leg for the spring assembly may be configured to be fit within the spring assembly tube; the leg for the damper assembly may be configured to be fit within the damper assembly tube. The fixture may be configured for alignment of the insert assembly in the spring assembly tube and for alignment of the insert assembly in the damper assembly tube. The fixture may be configured to axially align the cap insert in the spring assembly tube and to axially align the insert assembly in the spring assembly tube. The cap insert in the damper assembly tube and the insert assembly in the damper assembly tube are aligned. The step of installing each insert assembly for the fork may comprise installing the insert assembly for the spring assembly tube into the spring assembly tube with the adhesive bond and installing the insert assembly for the damper assembly tube into the damper assembly tube with the adhesive bond. The fork may comprise a composite material. The composite material may comprise a non-metallic material. The composite material may comprise a carbon-fiber material. The fixture may be configured to co-axially align the cap insert with the insert assembly in the spring assembly tube and to co-axially align the cap insert with the insert assembly in the damper assembly tube and to axially align in parallel the cap insert and the insert assembly in the spring assembly tube with the cap insert and the insert assembly in the damper assembly tube. The fixture may be configured to align the steer tube and the cap insert in the spring assembly tube and the cap insert in the damper assembly tube and the insert assembly in the spring assembly tube and the insert assembly in the damper assembly tube.

According to an exemplary embodiment shown schematically in FIGS. 2, 3A-3B, 4, 5, 6, 7, 8 and 9, a suspension fork assembly may comprise a fork comprising a steer tube and a spring assembly tube with a cap insert and an insert assembly for a spring assembly and a damper assembly tube with a cap insert and an insert assembly for a damper assembly; a leg for the spring assembly configured to be fit within the spring assembly tube of the fork; a leg for the damper assembly configured to be fit within the damper assembly tube of the fork; the fork may comprise a composite material. The suspension fork assembly may comprise the steer tube aligned with the spring assembly tube and aligned with the damper assembly tube; the suspension fork assembly may comprise a cap insert aligned in the spring assembly tube of the fork and attached by an adhesive bond and a cap insert aligned in the damper assembly tube of the fork and attached by an adhesive bond. The insert assembly in the spring assembly tube and the insert assembly in the damper assembly tube are aligned in parallel axial alignment. The insert assembly in the spring assembly tube may be axially aligned in parallel with the insert assembly in the damper assembly tube. The cap insert in the damper assembly tube may be axially aligned with the insert assembly in the damper assembly tube. The cap insert in the damper assembly tube and the insert assembly in the damper assembly tube are aligned in parallel axial alignment. The steer tube and the cap insert in the spring assembly tube and the cap insert in the damper assembly tube and the insert assembly in the spring assembly tube and insert assembly in the damper assembly tube are aligned. The fork may comprise a composite material. The composite material may comprise a carbon fiber material. The fork of the suspension fork assembly may comprise a pitch/distance; a pitch/distance may be provided between the spring assembly tube and the damper assembly tube; by maintaining the alignment of components during bonding/attachment in the fixture a pitch/distance of components may be maintained for the suspension fork assembly; components assembled for the fork may be aligned at a uniform/determined pitch/distance for the suspension fork assembly.

According to an exemplary embodiment shown schematically in the FIGURES, a suspension fork assembly may comprise a fork comprising components such as a steer tube and a spring assembly tube with a cap insert and an insert assembly and a damper assembly tube with a cap insert and an insert assembly and a leg for a spring assembly configured to be fit within the spring assembly tube of the fork and a leg for a damper assembly configured to be fit within the damper assembly tube of the fork; the fork may comprise a composite material such as a carbon-fiber material with components attached by an adhesive bond. The suspension fork assembly may be assembled by a process comprising the step of aligning at least two of the components. The suspension fork assembly may comprise an inverted fork with the leg for the spring assembly inserted within the spring assembly tube and the leg for the damper assembly inserted within the damper assembly tube.

TABLE B

REFERENCE SYMBOL LIST

| REFERENCE SYMBOL | ELEMENT, PART OR COMPONENT |
|---|---|
| B | BICYCLE |
| BR | BRAKE SYSTEM |
| D | DISC/ROTOR (BRAKE) |
| F | FRONT FORK ASSEMBLY |
| FR | FRAME |
| H | HANDLEBAR |
| FW | FRONT WHEEL |
| RW | REAR WHEEL |
| S | SEAT |
| SP | SEAT POST |
| ST | STEM |
| T | HEAD TUBE |
| CM | COMPOSITE MATERIAL (e.g. CARBON FIBER) |
| AD | ADHESIVE |
| 100 | SUSPENSION FORK |
| 102 | LEG |
| 104 | LEG |
| 106 | AXLE |
| 110 | CROWN STEER UNIT |
| 112 | TUBE |
| 112a | SPRING ASSEMBLY TUBE/SPRING TUBE |
| 112b | DAMPER ASSEMBLY TUBE/DAMPER TUBE |
| 116 | CAP INSERT |
| 118 | STEER TUBE |
| 120 | INSERT ASSEMBLY |
| 122 | LOWER INSERT |
| 124 | UPPER BUSHING |
| 125 | LOWER BUSHING |
| 126 | RING |

TABLE B-continued

| REFERENCE SYMBOL LIST | |
|---|---|
| REFERENCE SYMBOL | ELEMENT, PART OR COMPONENT |
| 128 | DUST SEAL |
| 130 | AIR SPRING ASSEMBLY |
| 132 | AIR CAP |
| 140 | DAMPER ASSEMBLY |
| 140x | NEEDLE |
| 141 | CARTRIDGE/CARTRIDGE TUBE |
| 142 | ADJUSTER KNOB |
| 144 | PISTON SEAT |
| 146 | SHIM |
| 148 | SHIM |
| 150 | PISTON ASSEMBLY |
| 152 | PISTON SPACER |
| 154 | SHIM |
| 155 | SPRING |
| 156 | COMPRESSSION PISTON |
| 158 | REBOUND PISTON |
| 160 | RING/GLIDE RING |
| 162 | SHIM |
| 164 | SHIM |
| 166 | SHIM |
| 168 | NUT |
| 170 | TOOL ASSEMBLY |
| 172 | SHAFT (with FLATS 172a, FLATS 172b, POCKETS 172c) |
| 174 | COLLAR |
| 176 | SCREW |
| 178 | O-RING |
| 180 | PISTON ASSEMBLY |
| 182 | INTERNAL FLOATING PISTON (with FLATS 182a, PROTRUSIONS 182b) |
| 184 | SCREW |
| 186 | SEAL |
| FX | FIXTURE |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A suspension fork assembly comprising:

(a) a fork comprising (1) a steer tube and (2) a spring assembly tube with a cap insert and an insert assembly for a spring assembly and (3) a damper assembly tube with a cap insert and an insert assembly for a damper assembly;

(b) a leg for the spring assembly configured to be fit within the spring assembly tube of the fork;

(c) a leg for the damper assembly configured to be fit within the damper assembly tube of the fork;

wherein the fork comprises a composite material;

wherein the fork is configured to be assembled with alignment of the spring assembly tube and/or the damper assembly tube.

2. The suspension fork assembly of claim 1 further comprising an adhesive bond for the steer tube of the fork and/or an adhesive bond for the cap insert for the spring assembly tube of the fork and/or an adhesive bond for the cap insert for the damper assembly tube of the fork and/or an adhesive bond for the insert assembly for the spring assembly tube of the fork and/or an adhesive bond for the insert assembly for the damper assembly tube of the fork.

3. The suspension fork assembly of claim 1 wherein the insert assembly in the spring assembly tube is axially aligned with the insert assembly in the damper assembly tube.

4. The suspension fork assembly of claim 1 wherein the cap insert in the damper assembly tube is co-axially aligned with the insert assembly in the damper assembly tube.

5. The suspension fork assembly of claim 1 wherein the cap insert in the spring assembly tube is co-axially aligned with the insert assembly in the spring assembly tube and the cap insert in the damper assembly tube is co-axially aligned with the insert assembly in the damper assembly tube and the insert assembly in the spring assembly tube is axially aligned in parallel with the insert assembly in the damper assembly tube.

6. The suspension fork assembly of claim 5 wherein the steer tube is axially aligned in parallel with the cap insert in the spring assembly tube and the steer tube is axially aligned in parallel with the cap insert in the damper assembly tube.

7. The suspension fork assembly of claim 1 wherein the steer tube is axially aligned in parallel with the insert assembly in the spring assembly tube and the steer tube is axially aligned in parallel with the insert assembly in the damper assembly tube.

8. The suspension fork assembly of claim 1 wherein the steer tube is axially aligned in parallel with the cap insert in the spring assembly tube and the steer tube is axially aligned in parallel with the cap insert in the damper assembly tube.

9. The suspension fork assembly of claim 1 wherein the insert assembly comprises a bushing and a seal.

10. The suspension fork assembly of claim 1 wherein the steer tube comprises a composite material.

11. The suspension fork assembly of claim 1 made by method comprising the steps of (a) preparing each insert assembly for bonding with an adhesive bond;

(b) applying adhesive to each insert assembly to provide the adhesive bond;

(c) installing each insert assembly for the fork;

(d) aligning each insert assembly in a fixture;

(e) curing the adhesive bond for each insert assembly.

12. The suspension fork assembly of claim 11 wherein the method further comprises the steps of preparing the cap insert for an adhesive bond in the fork and applying adhesive to the cap insert for the adhesive bond in the fork and attaching the cap insert in the fork with the adhesive bond before placing the fork in the fixture and curing the adhesive bond for the cap insert before removing the fork from the fixture.

13. The suspension fork assembly of claim 11 wherein the method further comprises the step of installing the cap insert for the spring assembly tube into the spring assembly tube with an adhesive bond and installing the cap insert for the damper assembly tube into the damper assembly tube with an adhesive bond.

14. The suspension fork assembly of claim 11 wherein the method further comprises the steps of preparing the steer tube for bonding to the fork and applying adhesive to the steer tube for an adhesive bond and attaching the steer tube to the fork with the adhesive bond before placing the fork in the fixture and curing the adhesive bond for the steer tube before removing the fork from the fixture.

15. A suspension fork assembly comprising:

a fork comprising:

(a) a steer tube;

(b) a spring assembly tube with an insert assembly and a leg for a spring assembly;

(c) a damper assembly tube with an insert assembly and a leg for a damper assembly wherein the fork comprises a composite material;

wherein the leg for the spring assembly is fit within the spring assembly tube;

wherein the leg for the damper assembly is fit within the damper assembly tube;

wherein the insert for the spring assembly tube is aligned with the fork and attached by an adhesive bond;

wherein the insert for the damper assembly tube is aligned with the fork and attached by an adhesive bond.

16. The suspension fork assembly of claim 15 wherein the insert for the damper assembly tube is in axial parallel alignment with the insert assembly for the spring assembly tube.

17. The suspension fork assembly of claim 15 further comprising a cap insert for the spring assembly tube and a cap insert for the damper assembly tube; wherein the cap insert for the spring assembly tube is attached to the spring assembly tube with an adhesive bond and the cap insert for the damper assembly tube is attached to the damper assembly tube with an adhesive bond; wherein the cap insert for the spring assembly tube is axially aligned with the insert assembly in the spring assembly tube.

18. The suspension fork assembly of claim 17 wherein the cap insert for the spring assembly tube is co-axially aligned with the insert assembly in the spring assembly tube and the cap insert for the for the damper assembly tube is co-axially aligned with the insert assembly in the damper assembly tube.

19. The suspension fork assembly of claim 15 wherein the steer tube is axially aligned with the insert assembly in the spring assembly tube and the steer tube is axially aligned with the insert assembly in the damper assembly tube; wherein the steer tube is attached by an adhesive bond; wherein the steer tube is in axial alignment with the insert assembly in the spring assembly tube and the steer tube is in axial alignment with the insert assembly in the damper assembly tube.

20. The suspension fork assembly of claim 15 wherein the fork and the steer tube comprise a carbon fiber material.

* * * * *